United States Patent
Maruhashi et al.

(10) Patent No.: US 10,366,109 B2
(45) Date of Patent: Jul. 30, 2019

(54) CLASSIFICATION DEVICE AND CLASSIFICATION METHOD

(71) Applicant: FUJITSU LIMITED, Kawasaki-shi, Kanagawa (JP)

(72) Inventors: Koji Maruhashi, Hachioji (JP); Nobuhiro Yugami, Minato (JP); Ryo Ochitani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 578 days.

(21) Appl. No.: 14/936,845

(22) Filed: Nov. 10, 2015

(65) Prior Publication Data

US 2016/0154875 A1 Jun. 2, 2016

(30) Foreign Application Priority Data

Nov. 28, 2014 (JP) ................. 2014-242012

(51) Int. Cl.
*G06F 16/28* (2019.01)
(52) U.S. Cl.
CPC .................. *G06F 16/285* (2019.01)
(58) Field of Classification Search
CPC ............................................. G06F 17/30598
See application file for complete search history.

(56) References Cited

FOREIGN PATENT DOCUMENTS

JP 2005-108111 A 4/2005

OTHER PUBLICATIONS

Daniel Barbara, Julia Couto, Yi Li, "COOLCAT: An entropy-based algorithm for categorical clustering", CIKM 2002, p. 582-p. 589.
Office Action dated Jun. 5, 2018, in corresponding Japanese Patent Application No. 2014-242012, 8 pgs.

*Primary Examiner* — William Spieler
(74) *Attorney, Agent, or Firm* — Staas & Halsey LLP

(57) ABSTRACT

A classification method executed by a computer for classifying a plurality of records into a plurality of groups, the classification method includes: acquiring the plurality of records, the plurality of records including a variable value respectively; tentatively classifying the plurality of records into the plurality of groups; calculating a commonality value indicating a degree of commonality of the variable value among the plurality of groups, based on the variable value included in each of the tentatively classified groups; classifying the plurality of records into the plurality of groups based on the commonality value; and outputting a result of the classifying.

18 Claims, 30 Drawing Sheets

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110}, {IP6,110}, {IP7,110} | $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(3/13)*(5/13)\}$, $-\log\{(3/13)*(5/13)\}$, $-\log\{(3/13)*(3/13)\}$, $-\log\{(1/13)*(3/13)\}$, $-\log\{(1/13)*(3/13)\}$ SUM: 16.7 | IP1: $-\log(1/19)$ IP2: $-\log(1/19)$ IP3: $-\log(1/19)$ IP4: $-\log(2/19)$ IP5: $-\log(1/19)$ IP6: $-\log(2/19)$ IP7: $-\log(2/19)$ 80: $-\log(1/19)$ 8080: $-\log(1/19)$ 110: $-\log(3/19)$ SUM: 11.4 |
| #2 | {IP4,110}, | $-\log\{(1/1)*(1/1)\}$ SUM: 0.0 | IP4: $-\log(2/19)$ 110: $-\log(3/19)$ SUM: 1.8 |
| #3 | {IP6,143}, {IP6,25}, {IP7,143}, {IP7,25}, {IP8,110}, {IP8,143}, {IP8,25}, {IP9,110}, {IP9,143}, {IP9,25} | $-\log\{(2/10)*(4/10)\}$, $-\log\{(2/10)*(4/10)\}$, $-\log\{(2/10)*(4/10)\}$, $-\log\{(2/10)*(4/10)\}$, $-\log\{(3/10)*(2/10)\}$, $-\log\{(3/10)*(4/10)\}$, $-\log\{(3/10)*(4/10)\}$, $-\log\{(3/10)*(2/10)\}$, $-\log\{(3/10)*(4/10)\}$, $-\log\{(3/10)*(4/10)\}$ SUM: 10.5 | IP6: $-\log(2/19)$ IP7: $-\log(2/19)$ IP8: $-\log(1/19)$ IP9: $-\log(1/19)$ 110: $-\log(3/19)$ 143: $-\log(1/19)$ 25: $-\log(1/19)$ SUM: 7.9 |
| | | TOTAL SUM: 27.2 | TOTAL SUM: 21.1 |
| | | EVALUATION VALUE: 48.3 | |

FIG. 2

LSD4

{IP1,80},
{IP1,8080},
{IP2,80},
{IP2,8080},
{IP3,80},
{IP3,8080},
{IP4,80},
{IP4,8080},
{IP5,80},
{IP5,8080},
{IP4,110},
{IP5,110},
{IP6,110},
{IP7,110},
{IP8,110},
{IP9,110},
{IP6,143},
{IP6,25},
{IP7,143},
{IP7,25},
{IP8,143},
{IP8,25},
{IP9,143},
{IP9,25}

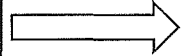
CLASSIFICATION

T110

| GROUP | GROUP COMPOSITION | IN-GROUP INFORMATION AMOUNT |
|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080} | -log{(2/10)*(5/10)}, -log{(2/10)*(5/10)}, -log{(2/10)*(5/10)}, -log{(2/10)*(5/10)}, -log{(2/10)*(5/10)}, -log{(2/10)*(5/10)}, -log{(2/10)*(5/10)}, -log{(2/10)*(5/10)}, -log{(2/10)*(5/10)}, -log{(2/10)*(5/10)} SUM: 10.0 |
| #2 | {IP4,110}, {IP5,110}, {IP6,110}, {IP7,110}, {IP8,110}, {IP9,110} | -log{(1/6)*(6/6)}, -log{(1/6)*(6/6)}, -log{(1/6)*(6/6)}, -log{(1/6)*(6/6)}, -log{(1/6)*(6/6)}, -log{(1/6)*(6/6)} SUM: 4.7 |
| #3 | {IP6,143}, {IP6,25}, {IP7,143}, {IP7,25}, {IP8,143}, {IP8,25}, {IP9,143}, {IP9,25} | -log{(2/8)*(4/8)}, -log{(2/8)*(4/8)}, -log{(2/8)*(4/8)}, -log{(2/8)*(4/8)}, -log{(2/8)*(4/8)}, -log{(2/8)*(4/8)}, -log{(2/8)*(4/8)}, -log{(2/8)*(4/8)} SUM: 7.2 |
| | | TOTAL SUM: 21.9 |
| | | EVALUATION VALUE: 24.9 |

FIG. 4

| GROUP | GROUP COMPOSITION | IN-GROUP INFORMATION AMOUNT |
|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110}, {IP6,110}, {IP7,110} | 1.2, 1.2, 1.2, 1.2, 1.2, 1.2, 1.2, 1.2, 1.1, 1.1, 1.3, 1.8, 1.8 SUM: 16.7 |
| #2 | {IP4,110} | 0.0 SUM: 0.0 |
| #3 | {IP6,143}, {IP6,25}, {IP7,143}, {IP7,25}, {IP8,110}, {IP8,143}, {IP8,25}, {IP9,110}, {IP9,143}, {IP9,25} | 1.1, 1.1, 1.1, 1.1, 1.2, 0.9, 0.9, 1.2, 0.9, 0.9 SUM: 10.4 |
|  |  | TOTAL SUM: 27.1 |
|  |  | EVALUATION VALUE: 30.1 |

T101

LARGEST

REARRANGEMENT ⇒ TO FIG. 5

EVALUATION VALUE IS BEST WHEN REARRANGED IN #2

FIG. 5

| GROUP | GROUP COMPOSITION | IN-GROUP INFORMATION AMOUNT |
|---|---|---|
| #1 | {IP1,80}, | 1.2, |
| | {IP1,8080}, | 1.2, |
| | {IP2,80}, | 1.2, |
| | {IP2,8080}, | 1.2, |
| | {IP3,80}, | 1.2, |
| | {IP3,8080}, | 1.2, |
| | {IP4,80}, | 1.2, |
| | {IP4,8080}, | 1.2, |
| | {IP5,80}, | 1.1, |
| | {IP5,8080}, | 1.1, |
| | {IP5,110}, | 1.2, |
| | {IP6,110} | 1.9 |
| | | SUM: 14.9 |
| #2 | {IP4,110}, | 0.3 |
| | {IP7,110} | 0.3 |
| | | SUM: 0.6 |
| #3 | {IP6,143}, | 1.1, |
| | {IP6,25}, | 1.1, |
| | {IP7,143}, | 1.1,. |
| | {IP7,25}, | 1.1, |
| | {IP8,110}, | 1.2, |
| | {IP8,143}, | 0.9, |
| | {IP8,25}, | 0.9, |
| | {IP9,110}, | 1.2, |
| | {IP9,143}, | 0.9, |
| | {IP9,25} | 0.9 |
| | | SUM: 10.4 |
| | | TOTAL SUM: 25.9 |
| | | EVALUATION VALUE: 28.9 |

T102

LARGEST

REARRANGEMENT FROM FIG.4

REARRANGEMENT TO FIG. 6

EVALUATION VALUE IS BEST WHEN REARRANGED IN #2

FIG. 6

REARRANGEMENT FROM FIG.5 →

T103

| GROUP | GROUP COMPOSITION | IN-GROUP INFORMATION AMOUNT |
|---|---|---|
| #1 | {IP1,80},<br>{IP1,8080},<br>{IP2,80},<br>{IP2,8080},<br>{IP3,80},<br>{IP3,8080},<br>{IP4,80},<br>{IP4,8080},<br>{IP5,80},<br>{IP5,8080} | 1.0,<br>1.0,<br>1.0,<br>1.0,<br>1.0,<br>1.0,<br>1.0,<br>1.0,<br>1.0,<br>1.0<br>SUM: 10.0 |
| #2 | {IP4,110},<br>{IP5,110},<br>{IP6,110},<br>{IP7,110} | 0.6<br>0.6<br>0.6<br>0.6<br>SUM: 2.4 |
| #3 | {IP6,143},<br>{IP6,25},<br>{IP7,143},<br>{IP7,25},<br>{IP8,110},<br>{IP8,143},<br>{IP8,25},<br>{IP9,110},<br>{IP9,143},<br>{IP9,25} | 1.1,<br>1.1,<br>1.1,<br>1.1,<br>1.2,<br>0.9,<br>0.9,<br>1.2,<br>0.9,<br>0.9<br>SUM: 10.4 |
| | | TOTAL SUM: 22.8 |
| | | EVALUATION VALUE: 25.8 |

LARGEST — {IP8,110}
LARGEST — {IP9,110}

| GROUP | GROUP COMPOSITION | IN-GROUP INFORMATION AMOUNT | VARIABLE VALUE |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080} | $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$ SUM: 10.0 | IP1 IP2 IP3 IP4 IP5 80 8080 |
| #2 | {IP4,110}, {IP5,110}, {IP6,110}, {IP7,110}, {IP8,110}, {IP9,110} | $-\log\{(1/6)*(6/6)\}$, $-\log\{(1/6)*(6/6)\}$, $-\log\{(1/6)*(6/6)\}$, $-\log\{(1/6)*(6/6)\}$, $-\log\{(1/6)*(6/6)\}$, $-\log\{(1/6)*(6/6)\}$ SUM: 4.7 | IP4 IP5 IP6 IP7 IP8 IP9 110 |
| #3 | {{IP6,143}, {IP6,25}, {IP7,143}, {IP7,25}, {IP8,143}, {IP8,25}, {IP9,143}, {IP9,25} | $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$ SUM: 7.2 | IP6 IP7 IP8 IP9 143 25 |
| | | TOTAL SUM: 21.9 | COMMONALITY NUMBER: 12 |
| | | EVALUATION VALUE: 24.9 | |

FIG. 8

| GROUP | GROUP COMPOSITION | IN-GROUP INFORMATION AMOUNT | VARIABLE VALUE |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080} | $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$ SUM: 10.0 | IP1 IP2 IP3 IP4 IP5 80 8080 |
| #2 | {IP4,110}, {IP5,110} | $-\log\{(1/2)*(2/2)\}$, $-\log\{(1/2)*(2/2)\}$ SUM: 0.6 | IP4 IP5 110 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6 IP7 IP8 IP9 110 143 25 |
| | | TOTAL SUM: 23.6 | COMMONALITY NUMBER: 6 |
| | | EVALUATION VALUE: 26.8 | |

Group #2: UNUSUAL COMMUNICATION GROUP

Group #3: TYPICAL COMMUNICATION GROUP

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110}, {IP6,110}, {IP7,110} | $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(3/13)*(5/13)\}$, $-\log\{(3/13)*(5/13)\}$, $-\log\{(3/13)*(3/13)\}$, $-\log\{(1/13)*(3/13)\}$, $-\log\{(1/13)*(3/13)\}$ SUM: 16.7 | IP1: $-\log(1/19)$ IP2: $-\log(1/19)$ IP3: $-\log(1/19)$ IP4: $-\log(2/19)$ IP5: $-\log(1/19)$ IP6: $-\log(2/19)$ IP7: $-\log(2/19)$ 80: $-\log(1/19)$ 8080: $-\log(1/19)$ 110: $-\log(3/19)$ SUM: 11.4 |
| #2 | {IP4,110}, | $-\log\{(1/1)*(1/1)\}$ SUM: 0.0 | IP4: $-\log(2/19)$ 110: $-\log(3/19)$ SUM: 1.8 |
| #3 | {IP6,143}, {IP6,25}, {IP7,143}, {IP7,25}, {IP8,110}, {IP8,143}, {IP8,25}, {IP9,110}, {IP9,143}, {IP9,25} | $-\log\{(2/10)*(4/10)\}$, $-\log\{(2/10)*(4/10)\}$, $-\log\{(2/10)*(4/10)\}$, $-\log\{(2/10)*(4/10)\}$, $-\log\{(3/10)*(2/10)\}$, $-\log\{(3/10)*(4/10)\}$, $-\log\{(3/10)*(4/10)\}$, $-\log\{(3/10)*(2/10)\}$, $-\log\{(3/10)*(4/10)\}$, $-\log\{(3/10)*(4/10)\}$ SUM: 10.5 | IP6: $-\log(2/19)$ IP7: $-\log(2/19)$ IP8: $-\log(1/19)$ IP9: $-\log(1/19)$ 110: $-\log(3/19)$ 143: $-\log(1/19)$ 25: $-\log(1/19)$ SUM: 7.9 |
| | | TOTAL SUM: 27.2 | TOTAL SUM: 21.1 |
| | | EVALUATION VALUE: 48.3 | |

FIG. 17

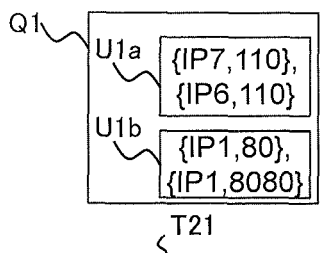

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110}, {IP6,110}, {IP7,110} | $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(2/13)*(5/13)\}$, $-\log\{(3/13)*(5/13)\}$, $-\log\{(3/13)*(5/13)\}$, $-\log\{(3/13)*(3/13)\}$, $-\log\{(1/13)*(3/13)\}$, $-\log\{(1/13)*(3/13)\}$ SUM: 16.7 | IP1: $-\log(1/19)$ IP2: $-\log(1/19)$ IP3: $-\log(1/19)$ IP4: $-\log(2/19)$ IP5: $-\log(1/19)$ IP6: $-\log(2/19)$ IP7: $-\log(2/19)$ 80: $-\log(1/19)$ 8080: $-\log(1/19)$ 110: $-\log(3/19)$ SUM: 11.4 |
| #2 | {IP4,110}, | $-\log\{(1/1)*(1/1)\}$ SUM: 0.0 | IP4: $-\log(2/19)$ 110: $-\log(3/19)$ SUM: 1.8 |
| #3 | {IP6,143}, {IP6,25}, {IP7,143}, {IP7,25}, {IP8,110}, {IP8,143}, {IP8,25}, {IP9,110}, {IP9,143}, {IP9,25} | $-\log\{(2/10)*(4/10)\}$, $-\log\{(2/10)*(4/10)\}$, $-\log\{(2/10)*(4/10)\}$, $-\log\{(2/10)*(4/10)\}$, $-\log\{(3/10)*(2/10)\}$, $-\log\{(3/10)*(4/10)\}$, $-\log\{(3/10)*(4/10)\}$, $-\log\{(3/10)*(2/10)\}$, $-\log\{(3/10)*(4/10)\}$, $-\log\{(3/10)*(4/10)\}$ SUM: 10.5 | IP6: $-\log(2/19)$ IP7: $-\log(2/19)$ IP8: $-\log(1/19)$ IP9: $-\log(1/19)$ 110: $-\log(3/19)$ 143: $-\log(1/19)$ 25: $-\log(1/19)$ SUM: 7.9 |
| | | TOTAL SUM: 27.2 | TOTAL SUM: 21.1 |
| | | EVALUATION VALUE: 48.3 | |

FIG. 18

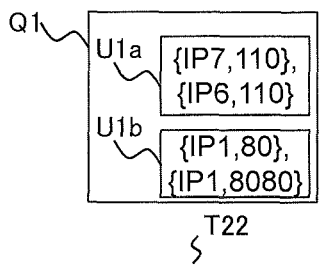

T22

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110} | $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(3/11)*(5/11)\}$, $-\log\{(3/11)*(5/11)\}$, $-\log\{(3/11)*(1/11)\}$ SUM: 12.1 | IP1: $-\log(1/19)$ IP2: $-\log(1/19)$ IP3: $-\log(1/19)$ IP4: $-\log(2/19)$ IP5: $-\log(1/19)$ 80: $-\log(1/19)$ 8080: $-\log(1/19)$ 110: $-\log(3/19)$ SUM: 9.5 |
| #2 | {IP4,110}, {IP7,110}, {IP6,110} | $-\log\{(1/3)*(3/3)\}$, $-\log\{(1/3)*(3/3)\}$, $-\log\{(1/3)*(3/3)\}$ SUM: 1.4 | IP4: $-\log(2/19)$ IP7: $-\log(2/19)$ IP6: $-\log(2/19)$ 110: $-\log(3/19)$ SUM: 3.7 |
| #3 | {IP6,143}, {IP6,25}, {IP7,143}, {IP7,25}, {IP8,110}, {IP8,143}, {IP8,25}, {IP9,110}, {IP9,143}, {IP9,25} | $-\log\{(2/10)*(4/10)\}$, $-\log\{(2/10)*(4/10)\}$, $-\log\{(2/10)*(4/10)\}$, $-\log\{(2/10)*(4/10)\}$, $-\log\{(3/10)*(2/10)\}$, $-\log\{(3/10)*(4/10)\}$, $-\log\{(3/10)*(4/10)\}$, $-\log\{(3/10)*(2/10)\}$, $-\log\{(3/10)*(4/10)\}$, $-\log\{(3/10)*(4/10)\}$ SUM: 10.5 | IP6: $-\log(2/19)$ IP7: $-\log(2/19)$ IP8: $-\log(1/19)$ IP9: $-\log(1/19)$ 110: $-\log(3/19)$ 143: $-\log(1/19)$ 25: $-\log(1/19)$ SUM: 7.9 |
| | | TOTAL SUM: 24.0 | TOTAL SUM: 21.1 |
| | | EVALUATION VALUE: 45.1 | |

FIG. 19

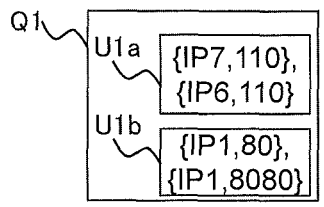

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110} | $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(3/11)*(5/11)\}$, $-\log\{(3/11)*(5/11)\}$, $-\log\{(3/11)*(1/11)\}$ SUM: 12.1 | IP1: $-\log(1/17)$ IP2: $-\log(1/17)$ IP3: $-\log(1/17)$ IP4: $-\log(2/17)$ IP5: $-\log(1/17)$ 80: $-\log(1/17)$ 8080: $-\log(1/17)$ 110: $-\log(3/17)$ SUM: 9.1 |
| #2 | {IP4,110}, | $-\log\{(1/1)*(1/1)\}$ SUM: 0.0 | IP4: $-\log(2/17)$ 110: $-\log(3/17)$ SUM: 1.7 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6: $-\log(1/17)$ IP7: $-\log(1/17)$ IP8: $-\log(1/17)$ IP9: $-\log(1/17)$ 110: $-\log(3/17)$ 143: $-\log(1/17)$ 25: $-\log(1/17)$ SUM: 8.1 |
|  |  | TOTAL SUM: 25.0 | TOTAL SUM: 18.9 |
|  |  | EVALUATION VALUE: 43.9 — SMALLEST | |

FIG. 20

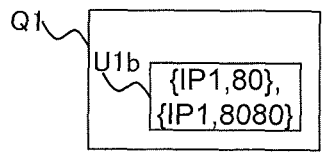

T31

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110} | $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(3/11)*(5/11)\}$, $-\log\{(3/11)*(5/11)\}$, $-\log\{(3/11)*(1/11)\}$ SUM: 12.1 | IP1: $-\log(1/17)$ IP2: $-\log(1/17)$ IP3: $-\log(1/17)$ IP4: $-\log(2/17)$ IP5: $-\log(1/17)$ 80: $-\log(1/17)$ 8080: $-\log(1/17)$ 110: $-\log(3/17)$ SUM: 9.1 |
| #2 | {IP4,110}, | $-\log\{(1/1)*(1/1)\}$ SUM: 0.0 | IP4: $-\log(2/17)$ 110: $-\log(3/17)$ SUM: 1.7 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6: $-\log(1/17)$ IP7: $-\log(1/17)$ IP8: $-\log(1/17)$ IP9: $-\log(1/17)$ 110: $-\log(3/17)$ 143: $-\log(1/17)$ 25: $-\log(1/17)$ SUM: 8.1 |
| | | TOTAL SUM: 25.0 | TOTAL SUM: 18.9 |
| | | EVALUATION VALUE: 43.9 SMALLEST | |

FIG. 21

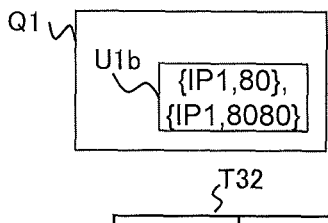

| GROUP | GROUP COMPOSITION | IN-GROUP INFORMATION AMOUNT | INTER-GROUP INFORMATION AMOUNT |
|---|---|---|---|
| #1 | {IP2,80}, {IP2,8080}, {IP3,80}, {IP3,8080}, {IP4,80}, {IP4,8080}, {IP5,80}, {IP5,8080}, {IP5,110} | $-\log\{(2/9)*(4/9)\}$, $-\log\{(2/9)*(4/9)\}$, $-\log\{(2/9)*(4/9)\}$, $-\log\{(2/9)*(4/9)\}$, $-\log\{(2/9)*(4/9)\}$, $-\log\{(2/9)*(4/9)\}$, $-\log\{(3/9)*(4/9)\}$, $-\log\{(3/9)*(4/9)\}$, $-\log\{(3/9)*(1/9)\}$ SUM: 8.5 | IP2: $-\log(1/19)$ IP3: $-\log(1/19)$ IP4: $-\log(2/19)$ IP5: $-\log(1/19)$ 80: $-\log(2/19)$ 8080: $-\log(2/19)$ 110: $-\log(3/19)$ SUM: 7.6 |
| #2 | {IP1,80}, {IP1,8080}, {IP4,110} | $-\log\{(2/3)*(1/3)\}$ $-\log\{(2/3)*(1/3)\}$ $-\log\{(1/3)*(1/3)\}$ SUM: 2.3 | IP1: $-\log(1/19)$ IP4: $-\log(2/19)$ 80: $-\log(2/19)$ 8080: $-\log(2/19)$ 110: $-\log(3/19)$ SUM: 5.0 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6: $-\log(1/19)$ IP7: $-\log(1/19)$ IP8: $-\log(1/19)$ IP9: $-\log(1/19)$ 110: $-\log(3/19)$ 143: $-\log(1/19)$ 25: $-\log(1/19)$ SUM: 8.5 |
| | | TOTAL SUM: 23.7 | TOTAL SUM: 21.1 |
| | | EVALUATION VALUE: 44.8 | |

FIG. 22

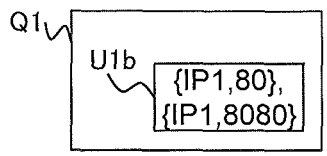

T33

| GROUP | GROUP COMPOSITION | IN-GROUP INFORMATION AMOUNT | INTER-GROUP INFORMATION AMOUNT |
|---|---|---|---|
| #1 | {IP2,80}, {IP2,8080}, {IP3,80}, {IP3,8080}, {IP4,80}, {IP4,8080}, {IP5,80}, {IP5,8080}, {IP5,110} | $-\log\{(2/9)*(4/9)\}$, $-\log\{(2/9)*(4/9)\}$, $-\log\{(2/9)*(4/9)\}$, $-\log\{(2/9)*(4/9)\}$, $-\log\{(2/9)*(4/9)\}$, $-\log\{(2/9)*(4/9)\}$, $-\log\{(3/9)*(4/9)\}$, $-\log\{(3/9)*(4/9)\}$, $-\log\{(3/9)*(1/9)\}$ SUM: 8.5 | IP2: $-\log(1/19)$ IP3: $-\log(1/19)$ IP4: $-\log(2/19)$ IP5: $-\log(1/19)$ 80: $-\log(2/19)$ 8080: $-\log(2/19)$ 110: $-\log(3/19)$ SUM: 7.6 |
| #2 | {IP4,110} | $-\log\{(1/1)*(1/1)\}$ SUM: 0.0 | IP4: $-\log(2/19)$ 110: $-\log(3/19)$ SUM: 1.8 |
| #3 | {IP1,80}, {IP1,8080}, {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(2/14)*(1/14)\}$, $-\log\{(2/14)*(1/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$, $-\log\{(3/14)*(4/14)\}$ SUM: 18.5 | IP1: $-\log(1/19)$ IP6: $-\log(1/19)$ IP7: $-\log(1/19)$ IP8: $-\log(1/19)$ IP9: $-\log(1/19)$ 80: $-\log(2/19)$ 8080: $-\log(2/19)$ 110: $-\log(3/19)$ 143: $-\log(1/19)$ 25: $-\log(1/19)$ SUM: 11.7 |
|  |  | TOTAL SUM: 27.1 | TOTAL SUM: 21.1 |
|  |  | EVALUATION VALUE: 48.1 | |

FIG. 25

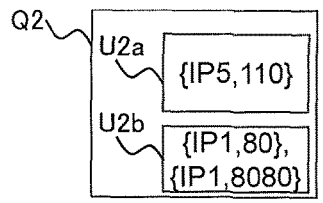

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080}, {IP5,110} | $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(2/11)*(5/11)\}$, $-\log\{(3/11)*(5/11)\}$, $-\log\{(3/11)*(5/11)\}$, $-\log\{(3/11)*(1/11)\}$ SUM: 12.1 | IP1: $-\log(1/17)$ IP2: $-\log(1/17)$ IP3: $-\log(1/17)$ IP4: $-\log(2/17)$ IP5: $-\log(1/17)$ 80: $-\log(1/17)$ 8080: $-\log(1/17)$ 110: $-\log(3/17)$ SUM: 9.1 |
| #2 | {IP4,110}, | $-\log\{(1/1)*(1/1)\}$ SUM: 0.0 | IP4: $-\log(2/17)$ 110: $-\log(3/17)$ SUM: 1.7 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6: $-\log(1/17)$ IP7: $-\log(1/17)$ IP8: $-\log(1/17)$ IP9: $-\log(1/17)$ 110: $-\log(3/17)$ 143: $-\log(1/17)$ 25: $-\log(1/17)$ SUM: 8.1 |
| | | TOTAL SUM: 25.0 | TOTAL SUM: 18.9 |
| | | EVALUATION VALUE: 43.9 | |

FIG. 26

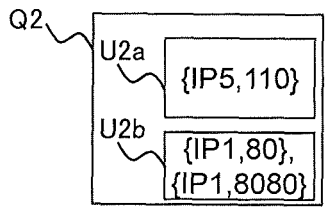

Q2
U2a: {IP5,110}
U2b: {IP1,80}, {IP1,8080}

T42

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080} | $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$ SUM: 10.0 | IP1: $-\log(1/17)$ IP2: $-\log(1/17)$ IP3: $-\log(1/17)$ IP4: $-\log(2/17)$ IP5: $-\log(2/17)$ 80: $-\log(1/17)$ 8080: $-\log(1/17)$ SUM: 8.0 |
| #2 | {IP4,110}, {IP5,110} | $-\log\{(1/2)*(2/2)\}$, $-\log\{(1/2)*(2/2)\}$ SUM: 0.6 | IP4: $-\log(2/17)$ IP5: $-\log(2/17)$ 110: $-\log(2/17)$ SUM: 2.8 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6: $-\log(1/17)$ IP7: $-\log(1/17)$ IP8: $-\log(1/17)$ IP9: $-\log(1/17)$ 110: $-\log(2/17)$ 143: $-\log(1/17)$ 25: $-\log(1/17)$ SUM: 8.3 |
| | | TOTAL SUM: 23.6 | TOTAL SUM: 19.1 |
| | | EVALUATION VALUE: 42.7 | |

SMALLEST

FIG. 27

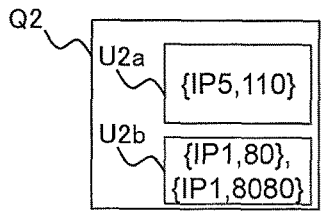

| GROUP | GROUP COMPOSITION | IN-GROUP INFORMATION AMOUNT | INTER-GROUP INFORMATION AMOUNT |
|---|---|---|---|
| #1 | {IP1,80}, {IP1,8080}, {IP2,80}, {IP2,8080}, {IP3,80}, {IP3,8080}, {IP4,80}, {IP4,8080}, {IP5,80}, {IP5,8080} | $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$, $-\log\{(2/10)*(5/10)\}$ SUM: 10.0 | IP1: $-\log(1/17)$ IP2: $-\log(1/17)$ IP3: $-\log(1/17)$ IP4: $-\log(2/17)$ IP5: $-\log(2/17)$ 80: $-\log(1/17)$ 8080: $-\log(1/17)$ SUM: 8.0 |
| #2 | {IP4,110}, | $-\log\{(1/1)*(1/1)\}$ SUM: 0.0 | IP4: $-\log(2/17)$ 110: $-\log(2/17)$ SUM: 1.9 |
| #3 | {IP5,110}, {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(1/13)*(5/13)\}$, $-\log\{(3/13)*(5/13)\}$, $-\log\{(3/13)*(4/13)\}$, $-\log\{(3/13)*(4/13)\}$, $-\log\{(3/13)*(5/13)\}$, $-\log\{(3/13)*(4/13)\}$, $-\log\{(3/13)*(4/13)\}$, $-\log\{(3/13)*(5/13)\}$, $-\log\{(3/13)*(4/13)\}$, $-\log\{(3/13)*(4/13)\}$, $-\log\{(3/13)*(5/13)\}$, $-\log\{(3/13)*(4/13)\}$, $-\log\{(3/13)*(4/13)\}$ SUM: 14.9 | IP5: $-\log(2/17)$ IP6: $-\log(1/17)$ IP7: $-\log(1/17)$ IP8: $-\log(1/17)$ IP9: $-\log(1/17)$ 110: $-\log(2/17)$ 143: $-\log(1/17)$ 25: $-\log(1/17)$ SUM: 9.2 |
| | | TOTAL SUM: 24.9 | TOTAL SUM: 19.1 |
| | | EVALUATION VALUE: 44.0 | |

FIG. 28

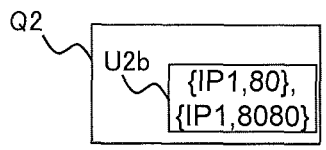

T51

| GROUP | GROUP COMPOSITION | IN-GROUP INFORMATION AMOUNT | INTER-GROUP INFORMATION AMOUNT |
|---|---|---|---|
| #1 | {IP1,80},<br>{IP1,8080},<br>{IP2,80},<br>{IP2,8080},<br>{IP3,80},<br>{IP3,8080},<br>{IP4,80},<br>{IP4,8080},<br>{IP5,80},<br>{IP5,8080} | $-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$,<br>$-\log\{(2/10)*(5/10)\}$<br>SUM: 10.0 | IP1: $-\log(1/17)$<br>IP2: $-\log(1/17)$<br>IP3: $-\log(1/17)$<br>IP4: $-\log(2/17)$<br>IP5: $-\log(2/17)$<br>80: $-\log(1/17)$<br>8080: $-\log(1/17)$<br>SUM: 8.0 |
| #2 | {IP4,110},<br>{IP5,110} | $-\log\{(1/2)*(2/2)\}$,<br>$-\log\{(1/2)*(2/2)\}$<br>SUM: 0.6 | IP4: $-\log(2/17)$<br>IP5: $-\log(2/17)$<br>110: $-\log(2/17)$<br>SUM: 2.8 |
| #3 | {IP6,110},<br>{IP6,143},<br>{IP6,25},<br>{IP7,110},<br>{IP7,143},<br>{IP7,25},<br>{IP8,110},<br>{IP8,143},<br>{IP8,25},<br>{IP9,110},<br>{IP9,143},<br>{IP9,25} | $-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$,<br>$-\log\{(3/12)*(4/12)\}$<br>SUM: 13.0 | IP6: $-\log(1/17)$<br>IP7: $-\log(1/17)$<br>IP8: $-\log(1/17)$<br>IP9: $-\log(1/17)$<br>110: $-\log(2/17)$<br>143: $-\log(1/17)$<br>25: $-\log(1/17)$<br>SUM: 8.3 |
| | | TOTAL SUM: 23.6 | TOTAL SUM: 19.1 |
| | | EVALUATION VALUE: 42.7 | |

SMALLEST

FIG. 29

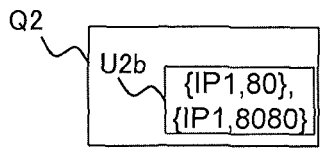
Q2 / U2b {IP1,80}, {IP1,8080}

T52

| GROUP | GROUP COMPOSITION | IN-GROUP INFORMATION AMOUNT | INTER-GROUP INFORMATION AMOUNT |
|---|---|---|---|
| #1 | {IP2,80}, {IP2,8080}, {IP3,80}, {IP3,8080}, {IP4,80}, {IP4,8080}, {IP5,80}, {IP5,8080} | $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$, $-\log\{(2/8)*(4/8)\}$ SUM: 7.2 | IP2: $-\log(1/18)$ IP3: $-\log(1/18)$ IP4: $-\log(2/18)$ IP5: $-\log(2/18)$ 80: $-\log(2/18)$ 8080: $-\log(2/18)$ SUM: 6.3 |
| #2 | {IP1,80}, {IP1,8080}, {IP4,110}, {IP5,110} | $-\log\{(2/4)*(1/4)\}$, $-\log\{(2/4)*(1/4)\}$, $-\log\{(1/4)*(2/4)\}$, $-\log\{(1/4)*(2/4)\}$ SUM: 3.6 | IP1: $-\log(1/18)$ IP4: $-\log(2/18)$ 80: $-\log(2/18)$ 8080: $-\log(2/18)$ 110: $-\log(2/18)$ SUM: 5.1 |
| #3 | {IP6,110}, {IP6,143}, {IP6,25}, {IP7,110}, {IP7,143}, {IP7,25}, {IP8,110}, {IP8,143}, {IP8,25}, {IP9,110}, {IP9,143}, {IP9,25} | $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$, $-\log\{(3/12)*(4/12)\}$ SUM: 13.0 | IP6: $-\log(1/18)$ IP7: $-\log(1/18)$ IP8: $-\log(1/18)$ IP9: $-\log(1/18)$ 110: $-\log(2/18)$ 143: $-\log(1/18)$ 25: $-\log(1/18)$ SUM: 8.5 |
| | | TOTAL SUM: 23.8 | TOTAL SUM: 19.9 |
| | | EVALUATION VALUE: 43.7 | |

FIG. 30

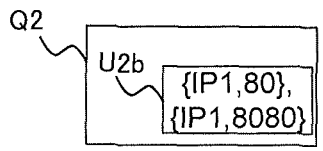

T53

| GROUP | GROUP COMPOSITION | IN-GROUP INFORMATION AMOUNT | INTER-GROUP INFORMATION AMOUNT |
|---|---|---|---|
| #1 | {IP2,80},<br>{IP2,8080},<br>{IP3,80},<br>{IP3,8080},<br>{IP4,80},<br>{IP4,8080},<br>{IP5,80},<br>{IP5,8080} | $-\log\{(2/8)*(4/8)\}$,<br>$-\log\{(2/8)*(4/8)\}$,<br>$-\log\{(2/8)*(4/8)\}$,<br>$-\log\{(2/8)*(4/8)\}$,<br>$-\log\{(2/8)*(4/8)\}$,<br>$-\log\{(2/8)*(4/8)\}$,<br>$-\log\{(2/8)*(4/8)\}$,<br>$-\log\{(2/8)*(4/8)\}$<br>SUM: 7.2 | IP2: $-\log(1/19)$<br>IP3: $-\log(1/19)$<br>IP4: $-\log(2/19)$<br>IP5: $-\log(2/19)$<br>80: $-\log(2/19)$<br>8080: $-\log(2/19)$<br>SUM: 6.5 |
| #2 | {IP4,110},<br>{IP5,110} | $-\log\{(1/2)*(2/2)\}$,<br>$-\log\{(1/2)*(2/2)\}$<br>SUM: 0.6 | IP4: $-\log(2/19)$<br>IP5: $-\log(2/19)$<br>110: $-\log(2/19)$<br>SUM: 2.9 |
| #3 | {IP1,80},<br>{IP1,8080},<br>{IP6,110},<br>{IP6,143},<br>{IP6,25},<br>{IP7,110},<br>{IP7,143},<br>{IP7,25},<br>{IP8,110},<br>{IP8,143},<br>{IP8,25},<br>{IP9,110},<br>{IP9,143},<br>{IP9,25} | $-\log\{(2/14)*(1/14)\}$,<br>$-\log\{(2/14)*(1/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$,<br>$-\log\{(3/14)*(4/14)\}$<br>SUM: 18.5 | IP1: $-\log(1/19)$<br>IP6: $-\log(1/19)$<br>IP7: $-\log(1/19)$<br>IP8: $-\log(1/19)$<br>IP9: $-\log(1/19)$<br>80: $-\log(2/19)$<br>8080: $-\log(2/19)$<br>110: $-\log(2/19)$<br>143: $-\log(1/19)$<br>25: $-\log(1/19)$<br>SUM: 11.9 |
|  |  | TOTAL SUM: 26.4 | TOTAL SUM: 21.3 |
|  |  | EVALUATION VALUE: 47.7 | |

CLASSIFICATION DEVICE AND CLASSIFICATION METHOD

CROSS-REFERENCE TO RELATED APPLICATION

This application is based upon and claims the benefit of priority of the prior Japanese Patent Application No. 2014-242012, filed on Nov. 28, 2014, the entire contents of which are incorporated herein by reference.

FIELD

The embodiment discussed herein is related to a technology to classify data.

BACKGROUND

There have been proposed various methods for classifying (also called grouping or clustering) so-called discrete data into groups. The discrete data includes, for example, a point of sale system (POS) record with an identifier (ID), World Wide Web (WEB) access log record, and the like.

A discrete data analyst analyzes classified discrete data (in other words, a record of each group) for the purpose of inferring intentions and behaviors of people. For example, such an analyst analyzes the classified discrete data for the purpose of inferring purchase behavior based on common consumer demands and of inferring WEB browsing behavior based on a common interest.

As one of the methods for classifying the discrete data, there is a method of classifying discrete data by referring to a group evaluation value calculated based on an occurrence probability (also called appearance probability) of a record within a group and a constant multiple of the number of groups. A related technology is disclosed in "COOLCAT: an entropy-based algorithm for categorical clustering" by Daniel Barbara et al., CIKM (2002), for example.

SUMMARY

According to an aspect of the invention, a classification method executed by a computer for classifying a plurality of records into a plurality of groups, the classification method includes: acquiring the plurality of records, the plurality of records including a variable value respectively; tentatively classifying the plurality of records into the plurality of groups; calculating a commonality value indicating a degree of commonality of the variable value among the plurality of groups, based on the variable value included in each of the tentatively classified groups; classifying the plurality of records into the plurality of groups based on the commonality value; and outputting a result of the classifying.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of the discrete data and an example of a group composition table illustrating records and the like within each group when the discrete data is classified using one method;

FIG. 4 is a diagram illustrating a group composition table illustrating initial groups;

FIG. 5 is a first diagram illustrating a group composition table after rearrangement;

FIG. 6 is a second diagram illustrating a group composition table after rearrangement;

FIG. 7 is a first diagram illustrating a problem of the method;

FIG. 8 is a second diagram illustrating a problem of the method;

FIG. 14 is a second diagram illustrating a specific example according to the embodiment;

FIG. 17 is a fifth diagram illustrating a specific example according to the embodiment;

FIG. 18 is a sixth diagram illustrating a specific example according to the embodiment;

FIG. 19 is a seventh diagram illustrating a specific example according to the embodiment;

FIG. 20 is an eighth diagram illustrating a specific example according to the embodiment;

FIG. 21 is a ninth diagram illustrating a specific example according to the embodiment;

FIG. 22 is a tenth diagram illustrating a specific example according to the embodiment;

FIG. 25 is a thirteenth diagram illustrating a specific example according to the embodiment;

FIG. 26 is a fourteenth diagram illustrating a specific example according to the embodiment;

FIG. 27 is a fifteenth diagram illustrating a specific example according to the embodiment;

FIG. 28 is a sixteenth diagram illustrating a specific example according to the embodiment;

FIG. 29 is a seventeenth diagram illustrating a specific example according to the embodiment; and FIG. 30 is an eighteenth diagram illustrating a specific example according to the embodiment.

DESCRIPTION OF EMBODIMENT

In a conventional method of classifying discrete data, an evaluation value is calculated based on an occurrence probability of a record and a constant multiple of the number of groups. Therefore, it has been difficult to classify the discrete data into groups that may easily achieve an analyst's purpose.

An aspect of an embodiment is to classify discrete data into groups according to purposes.

[Records Included in Discrete Data]

Figure 1A:
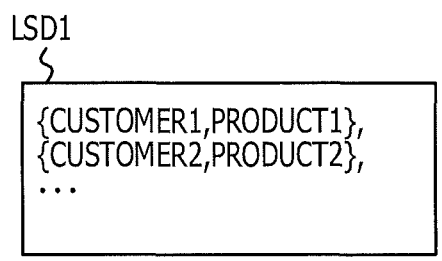
FIGS. 1A, 1B, and 1C are diagrams illustrating records included in discrete data.
Figure 1B:
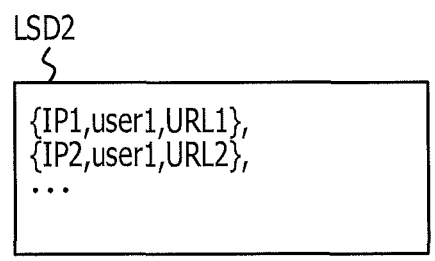
Figure 1C:
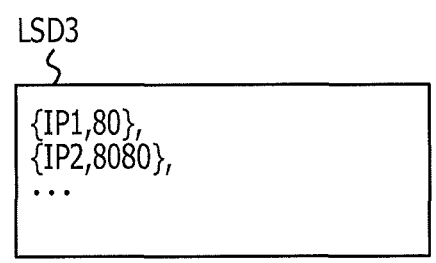

FIGS. 1A, 1B, and 1C are diagrams illustrating records included in discrete data. In the following drawings, " . . . " indicates omission.

FIG. 1A is a diagram illustrating discrete data LSD1 including POS records with IDs. Each of the POS records with IDs includes two kinds of variable values. The first kind of the variable values is a customer ID that uniquely identifies a customer. The second kind of the variable values is a product ID that uniquely identifies a product. In FIG. 1A, "{customer ID, product ID}" indicates one record. The comma (",") between the braces "{ }, { }" separates the records. In FIG. 1A, the record {Customer 1, Product 1}, for example, includes "Customer 1" as the customer ID and "Product 1" as the product ID.

FIG. 1B is a diagram illustrating discrete data LSD2 including WEB access log records. Each of the WEB access log records includes three kinds of variable values. The first kind of the variable values is an IP address of a server to be accessed. The second kind of the variable values is a user ID that uniquely identifies a user who has accessed the server. The third kind of the variable values is an accessed uniform resource locator (URL).

In FIG. 1B, {IP address, user ID, URL} indicates one record. The comma (",") between the braces "{ }, { }" separates the records. In FIG. 1B, the record {IP1, user1, URL1} includes "IP1" as the IP address, "user1" as the user ID, and "URL1" as the URL, for example.

FIG. 1C is a diagram illustrating discrete data LSD3 including network traffic log (hereinafter appropriately described as traffic log) records. A traffic log includes a destination IP address and a destination port number, which are included in a communication packet transmitted and received between apparatuses, when the apparatuses communicate with each other using a transmission control protocol (TCP)/internet protocol (IP) protocol.

Each of the traffic log records includes two kinds of variable values. The first kind of the variable values is a destination IP address. The second kind of the variable values is a destination port number.

In FIG. 1C, {destination IP address, destination port number} indicates one record. The comma (",") between the braces "{ }, { }" separates the records. In FIG. 1C, the record {IP1, 80} includes "IP1" as the IP address and "80" as the port number, for example.

The number of records included in the discrete data is hundreds of thousands to tens of millions, for example. The kinds (also called the number of pieces) of variable values included in each of the records are two to ten kinds (pieces), for example. The range of the value that may be taken by each variable is thousands to tens of thousands, for example.

[Method of Classifying Discrete Data]

A method (hereinafter appropriately described as the method) for classifying discrete data is described. In the case of classifying a plurality of records included in the discrete data, the method classifies the discrete data in such a manner as to reduce a variation in variable value in each record within a group. Note that classifying the plurality of records included in the discrete data is synonymous with classifying the discrete data.

In other words, in the case of classifying the discrete data, the method classifies the discrete data in such a manner as to reduce rare variable values among the variable values within a group. The method is described with reference to FIGS. 2 to 6.

(Group Composition Table)

FIG. 2 illustrates an example of the discrete data and an example of a group composition table illustrating records and the like within a group when the discrete data is classified by the method.

Discrete data LSD4 is an example of discrete data including the traffic log records described with reference to FIG. 1C. In the following description, to simplify the explanation, it is assumed that the number of records included in the discrete data LSD4 to be classified is 24.

A group composition table T110 is a table illustrating a composition of classified records (in other words, a group composition of records). The group composition table T110 has a group column, a group composition column, and an in-group information amount column. The group column stores a group identifier that uniquely identifies a group including one or more records. The group identifier is indicated by "#k" (the lowercase letter k is an integer of 1 or more), for example.

The group composition column is a column that stores records belonging to a group identified by the group identifier. Note that the records belonging to the group are synonymous with records in the group and records included in the group. The in-group information amount column stores in-group information amount of the records stored in the group composition column.

The in-group information amount is the logarithm of the reciprocal of an appearance probability (also called occurrence probability) of each of the records in a group. Note that the logarithm is, for example, a common logarithm, which is a logarithm with base 10. The appearance probability of a record is the product of appearance probabilities, in a group to which the record belongs, of respective variable values included in the records belonging to the group. The appearance probability of each of the variable values is a value obtained by dividing the total number of the same variable values included in one or more records belonging to a certain group (described as group X) by the total number of the records belonging to group X.

In FIG. 2, the in-group information amount of the record {IP1, 80} belonging to the first group #1 is calculated. The total number of the same variable values IP1 in the record {IP1, 80} belonging to the first group #1 is two (see the records {IP1, 80} and {IP1, 8080}). Also, the total number of the same variable values 80 in the record {IP1, 80} belonging to the first group #1 is five (see the records {IP1, 80}, {IP2, 80}, {IP3, 80}, {IP4, 80}, and {IP5, 80}). The total number of the records belonging to the first group #1 is ten.

Therefore, the appearance probability of the same variable values IP1 is (2/10). Also, the appearance probability of the same variable values 80 is (5/10). Therefore, the in-group information amount of the record {IP1, 80} in the first group #1 is $-\log\{(2/10)*(5/10)\}$ (see the dashed-dotted line frame in FIG. 2). Note that "/" within the logarithm (log) in the in-group information amount denotes division and "*" denotes multiplication. Note that the appearance probability of the record is also called a joint probability of a value.

In FIG. 2, the in-group information amount of a certain record (described as record X) is an in-group information amount (described as in-group information amount X) stored in the same row as the row (parallel position) in which record X is stored in the group composition column. For example, when record X is the record {IP1, 80} in the first group #1 (see the dotted line frame in FIG. 2), in-group information amount X of record X is $-\log\{(2/10)*(5/10)\}$ (see the dashed-dotted line frame in FIG. 2) in the first group #1.

The sum of the in-group information amount of the records belonging to the k-th (the lowercase letter k is an integer of 1 or more) group #k is illustrated below the cell that stores the records. For example, the sum of the in-group information amount of the records belonging to the first group #1 is "10.0". This is because the total number of the records belonging to the first group #1 is ten. Also, the in-group information amount of the records belonging to the first group #1 is "$-\log\{(2/10)*(5/10)\}$", that is, ("1"). Therefore, the sum of the in-group information amount of the records belonging to the first group #1 is "10.0" (see the dotted line frame in FIG. 2).

In the group composition table T110, the cell at which the second row from the bottom and the in-group information amount column intersect stores the total sum of the in-group information amounts of the records in the respective group. For example, the sums of the in-group information amounts of the records in the first to third groups #1 to #3 are "10.0", "4.7", and "7.2", respectively. Therefore, the total sum is "21.9".

In the group composition table T110, the cell at which the bottom row and the in-group information amount column intersect stores an evaluation value of the group composition. The evaluation value of the group composition in the method is the sum of the total sum of the in-group information amounts and a constant multiple of the number of groups. Here, it is assumed that the constant multiple is 1. In the example of the group composition table T110, the number of groups is 3, since the data is divided into three groups (the first to third groups #1 to #3). Thus, a constant multiple of the number of groups is 3. Therefore, the evaluation value of the group composition is 24.9 (21.9+ 3.0).

(Flowchart of Method of Classifying Discrete Data)

Figure 3:
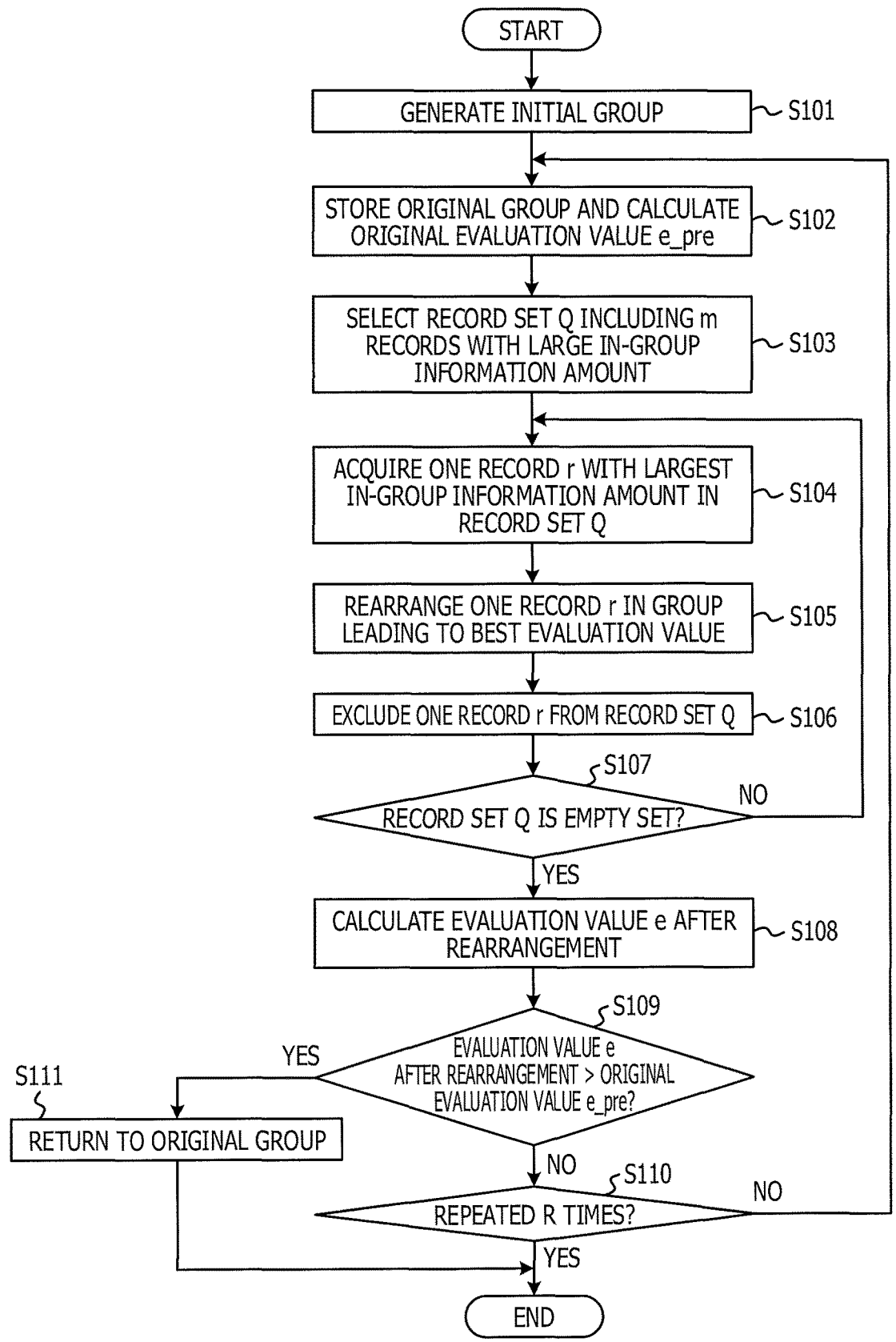
FIG. 3 is a flowchart illustrating a processing flow of a method of classifying the discrete data.

FIG. 3 is a flowchart illustrating a processing flow of the method of classifying the discrete data. Note that, in the flowchart, "Ss" (the lowercase letter s is an integer of 1 or more) denotes Step Ss.

Step S101: the method generates an initial group. To be more specific, the method freely (that is, randomly) selects k (k is an integer of 1 or more) records, which share less variable values with each other, from among records included in discrete data to be classified, thereby creating k groups including the selected records, one for each group.

Each of the selected records is a record serving as the core (also called the seed) of each group. Thereafter, the method adds a record similar to the record serving as the core to the group including the record serving as the core. To be more specific, the method sequentially arranges the records included in the discrete data to be classified, except for the k records, in the k groups in such a manner as to obtain the best evaluation value, thus generating k initial groups.

Step S102: the method stores an original group to calculate an evaluation value e_pre of the original group. The original group is the initial group (S101) when S101 is executed for the first time. In the case of second or subsequent execution of S102, the original group is the group after completion of S105. Note that the method stores the group in the form of the group composition table, for example.

Step S103: the method selects a record set Q including m (m is an integer of 1 or more) pieces of data with a large in-group information amount.

Step S104: the method acquires one record r having the largest in-group information amount in the record set Q.

Step S105: the method rearranges the acquired one record r in the group leading to the best evaluation value. Here, the best evaluation value is synonymous with the lowest evaluation value.

Step S106: the method excludes the one record r from the record set Q.

Step S107: the method determines whether or not the record set Q is an empty set. When the record set Q is not the empty set (S107/NO), the processing moves to S104. When the record set Q is the empty set (S107/YES), the processing moves to S108.

Step S108: the method calculates an evaluation value e after the rearrangement.

Step S109: the method determines whether or not the evaluation value e after the rearrangement exceeds the original evaluation value e_pre. When the evaluation value e after the rearrangement does not exceed the original evaluation value e_pre (S109/NO), the processing moves to S110. When the evaluation value e after the rearrangement exceeds the original evaluation value e_pre (S109/YES), the processing moves to S111.

Step S110: the method determines whether or not Steps S102 to S103 are repeated R times. When Steps S102 to S103 are repeated R times (S110/YES), the method terminates the processing. The method sets the group after the rearrangement at the end of the processing as the group of the classified discrete data. When Steps S102 to S103 are not repeated R times (S110/NO), the method moves to S102.

Step S111: the method returns the record r rearranged in S105 back to the original group, and sets the group before the rearrangement as the group of the classified discrete data.

(Specific Example of Method of Classifying Discrete Data)

With reference to FIGS. 2 to 6, description is given of a specific example of the method of classifying the discrete data. FIG. 4 is a diagram illustrating a group composition table illustrating initial groups. FIGS. 5 and 6 are first and second diagrams illustrating group composition tables after rearrangement. Note that the group composition tables illustrated in FIGS. 4 to 6 have the same configuration as that of the group composition table T110 illustrated in FIG. 2. However, to simplify the explanation, in-group information amounts in the group composition tables illustrated in FIGS. 4 to 6 are indicated by values rather than formulas.

The method randomly selects k (k is 3, for example) records, which share less variable values with each other, from among records included in discrete data to be classified, thereby creating k groups including the selected records, one for each group. Then, the method selects three records (for example, {IP1, 80}, {IP4, 110}, and {IP6, 143}) from among the records included in the discrete data LSD4 illustrated in FIG. 2, thus creating three groups. Thereafter, the method sequentially arranges the records included in the discrete data to be classified, except for the three records, in the three groups in such a manner as to obtain the best evaluation value, thus generating initial groups.

The method stores a group composition table T101 that is the original group, and calculates an evaluation value e_pre of the original group (S102). The evaluation value of the original group is "30.1" as illustrated in FIG. 4.

The method selects a record set Q including m (m is 3 in this step) pieces of data with a large in-group information amount (S103). Note that the method may appropriately change "m" for each step. In the example illustrated in FIG. 4, the method selects the records {IP6, 110} and {IP7, 110} having the in-group information amount of 1.8 and the record {IP5, 110} having the in-group information amount of 1.3 (see the dotted line frame).

The method acquires one record r (for example, {IP7, 110}, see "maximum" balloon in FIG. 4) having the largest in-group information amount in the record set Q (S104). The method rearranges the record r in the second group #2 leading to the best evaluation value (that is, the lowest evaluation value) as a result of rearrangement (S105) (see "best evaluation value if rearranged in #2" in FIG. 4).

The method excludes the one record r ({IP7, 110}) from the record set Q (S106).

FIG. 5 illustrates a group composition table T102 in which the record r ({IP7, 110}) is rearranged in the second group #2. Note that the method updates the in-group information amount after the rearrangement (see S105) as illustrated in FIG. 5.

Since the record set Q is not an empty set (S107/NO), the processing moves to S104. The method acquires one record r (for example, {IP6, 110}, see "maximum" balloon in FIG. 5) having the largest in-group information amount in the record set Q ({IP5, 110} and {IP6, 110}) (S104). The method rearranges the record r in the second group #2 leading to the best evaluation value as a result of rearrangement (S105) (see "best evaluation value if rearranged in #2" in FIG. 5).

The method excludes the one record r ({IP6, 110}) from the record set Q (S106). Thereafter, the method performs the processing of S107 and S104 to S106 on the record set Q, rearranges the record {IP5, 110} included in the record set Q in the second group #2, and excludes the record {IP5, 110} from the record set Q.

FIG. 6 illustrates a group composition table T103 in which all the records ({IP5, 110}, {IP6, 110}, and {IP7, 110}) in the record set Q are rearranged in the second group #2. When the record set Q becomes an empty set (S107/YES), the method calculates an evaluation value e after the rearrangement (S108). The evaluation value after the rearrangement is "25.8" as illustrated in the group composition table T103 illustrated in FIG. 6.

Since the evaluation value e after the rearrangement does not exceed the original evaluation value e_pre (S109), the method determines whether or not Steps S102 to S103 are repeated R times (for example, twice). In the above example, the method moves to S102 since Steps S102 to S103 are repeated once (S110/NO).

The method stores a group composition table T103 that is the original group, and calculates an evaluation value e_pre of the original group (S102). The evaluation value of the original group is "25.8" as illustrated in FIG. 6.

The method selects a record set Q including m (m is 2 in this step) records with a large in-group information amount (S103). In the example illustrated in FIG. 6, the method selects the records {IP8, 110} and {IP9, 110} having the in-group information amount of 1.2 (see the dotted line frame and "maximum" balloon in FIG. 6). Thereafter, the method repeatedly performs the processing of S104 to S107 and rearranges the records {IP8, 110} and {IP9, 110} in the second group #2. The group composition table after the rearrangement is the group composition table T110 illustrated in FIG. 2.

Then, when the record set Q becomes an empty set (S107/YES), the method calculates an evaluation value e after the rearrangement (S108). The evaluation value after the rearrangement is "24.9" as illustrated in FIG. 2. Note that, in FIG. 2, the in-group information amounts are indicated by formulas, and description of values is omitted.

Since the evaluation value e after the rearrangement does not exceed the original evaluation value e_pre (S109/NO), the method determines whether or not Steps S102 to S103 are repeated R times (for example, twice). In the above example, the method terminates the processing since Steps S102 to S103 are repeated twice (S110/NO).

As a result of classification of the discrete data LSD4 by the method, the records included in the discrete data LSD4 are classified into the first to third groups #1 to #3 as illustrated in FIG. 2. A discrete data analyst infers intentions and behaviors of people by referring to the classified records.

(Problem of Method)

Next, a problem of the method is described. Depending on the contents of the records included in the discrete data, an optimum group varies, which may achieve the purpose of the discrete data analyst. The optimum group is a group corresponding to the analyst's purpose. More specifically, in order to achieve the analyst's purpose, it is preferable to change the classification method. For example, the discrete data LSD4 described with reference to FIG. 2 includes traffic log records. In the case of classifying discrete data including such records, it is preferable to consider other elements (for example, a commonality number described below) rather than just considering the total sum of the in-group information amounts.

FIG. 7 is a first diagram illustrating the problem of the method. A group composition table T104 illustrated in FIG. 7 is a table obtained by adding a variable value column to the right column of the group composition table T110 illustrated in FIG. 2.

The variable value column stores variable values of the records stored in the group composition column. For example, the variable values of the records stored in the group composition column for the first group #1 are IP1, IP2, IP3, IP4, IP5, 80, and 8080. Therefore, in the cell at which the variable value column and the row storing the group identifier "#1" of the first group #1 intersect, the variable values IP1, IP2, IP3, IP4, IP5, 80, and 8080 are stored.

In the group composition table T104, the cell at which the second row from the bottom and the variable value column intersect is a cell that stores the commonality number. When different groups share the same variable value, the commonality number indicates the total number of the same variable values. For example, the different first and second groups #1 and #2 share the same variable values IP4 and IP5. The dotted frames indicate the same variable values shared by different groups. In the example illustrated in FIG. 7, the total number of the variable values in the dotted frames is the commonality number, which is 12.

FIG. 8 is a second diagram illustrating a problem of the method. A group composition table T105 illustrated in FIG. 8 has the same configuration as that of the group composition table T104 illustrated in FIG. 7. The group composition table T105 is a group composition table obtained by classifying the discrete data LSD4 using a method different from the method described above.

In the group composition table T105 illustrated in FIG. 8, the records {IP6, 110}, {IP7, 110}, {IP8, 110}, and {IP9, 110} in the second group #2 in the group composition table T104 illustrated in FIG. 7 are arranged in the third group #3. In FIG. 8, again, the dotted frames indicate the same variable values shared by different groups, as in the case of FIG. 7. In the example illustrated in FIG. 8, the total number of the variable values in the dotted frames is the commonality number, which is 6. In the example illustrated in FIG. 8, the different first and second groups #1 and #2 share the same variable values IP4 and IP5, while the different second and third groups #2 and #3 share the same variable value 110.

In FIG. 8, attention is focused on the records {IP4, 80}, {IP4, 8080}, {IP5, 80}, and {IP5, 8080} belonging to the first group #1 and the records {IP4, 110} and {IP5, 110} belonging to the second group #2. Here, it is assumed that a first server for which the IP address IP4 is set is a WEB server, and a second server for which the IP address IP5 is set is a WEB server. Thus, the first and second servers are the WEB servers, not mail servers.

Here, a mail server for e-mail distribution, for example, uses characteristic port numbers 25, 110, and 143. The port number 25 is an SMTP port number, the port number 110 is a POP3 port number, and the port number 143 is an IMAP4 port number. Note that SMTP stands for "Simple Mail Transfer Protocol", POP stands for "Post Office Protocol", and IMAP stands for "Internet Message Access Protocol".

However, the records {IP4, 110} and {IP5, 110} belonging to the second group #2 indicates that a TCP/IP packet is transmitted using the port number 110 of the first and second servers, which are the WEB servers, as a destination port number. A server that executes communication using (also called releasing) the port number 110 is the mail server. However, the first and second servers, for which the IP addresses IP4 and IP5 are set, are the WEB servers, not the mail servers. The communication through such a TCP/IP packet is likely to be communication intended for port scan or attack against a specific port. Note that the communication through the TCP/IP packet is also called a so-called unusual communication group.

More specifically, the records {IP4, 110} and {IP5, 110} of the TCP/IP packet are likely to be a group of records generated by the behavior based on unusual intentions such as an intention to commit a fraud.

When analyzing the classified discrete data for the purpose of finding behaviors based on such unusual intentions, classification (grouping) of the records generated by the behavior based on such unusual intentions makes it easier for the discrete data analyst to find such a behavior. When such a behavior is found, the analyst instructs a network administrator or the like to take measures to reduce a fraud.

Note that, in the case of POS with an identifier, it is assumed that a store staff member performs a checkout operation as if a purchase is made, based on the intention to commit a fraud, even though the purchase is not actually made. In the case of this assumption, a POS system generates a record having contents that deviate from contents of a POS record generated by a normal purchase behavior. The record having such deviant contents is also a record generated by a behavior based on an unusual intention.

Meanwhile, in the method, there is a case where groups are generated by port number as a group composition having a small sum of in-group information amount. According to the group composition table T104 illustrating the groups generated by the method, the first group #1 is a group including records including the port numbers 80 and 8080. Note that the port numbers 80 and 8080 are port numbers for Hypertext Transfer Protocol (HTTP) of the WEB server.

The second group #2 is a group including records including the port number 110. The third group #3 is a group including records including the port numbers 25 and 143.

However, in the case of classifying discrete data for the purpose of finding an unusual communication group, for example, it is desirable to generate record groups as described below. More specifically, a record group related to a server using a combination of characteristic (also called typical) port numbers is put together, and a record group indicating a communication group that deviates from the combination of characteristic port numbers is set as another record group. Note that the purpose of finding the unusual communication group is included in the purpose of finding the records generated by the behavior based on unusual intentions such as an intention to commit a fraud described above.

In the example illustrated in FIG. 8, records (see "typical communication" balloon) belonging to the third group #3, which are surrounded by the dashed-dotted line are the record group related to the server using the combination of characteristic port numbers. Also, in the example illustrated in FIG. 8, records (see "unusual communication" balloon) belonging to the second group #2, which are surrounded by the dashed-two dotted line are the record group indicating the deviant communication group. Accordingly, the record {IP5, 110} belonging to the first group #1 illustrated in FIG. 7 becomes, when belonging to the second group #2 as illustrated in FIG. 8, an optimum group that may achieve the analyst's purpose of finding the unusual communication group. Besides the above, the records {IP6, 110}, {IP7, 110}, {IP8, 110}, and {IP9, 110} belonging to the second group #2 illustrated in FIG. 7 become, when belonging to the third group #3 as illustrated in FIG. 8, optimum groups that may achieve the analyst's purpose of finding the unusual communication group.

As described above, when the analyst's purpose is the purpose of finding the unusual communication group, for example, using a method different from the method described above makes it possible to classify the discrete data into optimum groups that may easily achieve the analyst's purpose.

Here, comparison between FIGS. 7 and 8 indicates that the total sum (23.6) of the in-group information amounts in FIG. 8 is larger than the total sum (21.9) of the in-group information amounts in FIG. 7. Note that, in FIGS. 7 and 8, since the number of groups (3) is the same, the evaluation value (26.6) in FIG. 8 is larger than the evaluation value (24.9) in FIG. 7. However, the commonality number (6) in FIG. 8 is smaller than the commonality number (12) in FIG. 7.

The sum of the in-group information amounts in the case of classification using another method is larger than the sum of the in-group information amounts in the case of classification using the method. However, the commonality number in the case of classification using another method is smaller than the commonality number in the case of classification using the method (described as a characteristic point).

It may be seen from this characteristic point that, when the analyst's purpose is to find the behavior based on unusual intentions such as an intention to commit a fraud, the discrete data may be classified into optimum groups that may easily achieve the analyst's purpose by taking into consideration not only the in-group information amounts but also the commonality number. In this classification, the discrete data may be classified into optimum groups by performing the classification in such a manner as to minimize the commonality number.

In a minimum description length (MDL) principle in the information theory, it is known that the smaller the sum of complexity of a model and errors with respect to actual data when represented by the model, the better the description of the data. In the classification of the discrete data, such a model corresponds to a group of records, for example, and the complexity of the model corresponds to the number of variable values different from each other within the group, for example. Also, the error corresponds to the appearance probability of records and in-group information amount described above.

In the minimum description length principle, it is considered possible to create optimum groups if the number of the variable values different from each other within the group is reduced (in other words, the complexity of the model is reduced). The number of variable values belonging to this group may also be reduced by classification performed in such a manner as to minimize the number (commonality number) of the same variable values belonging to different groups.

Embodiment

Therefore, a data classification apparatus according to an embodiment classifies (also called divides) a plurality of records into a plurality of groups in such a manner as to reduce a commonality value indicating a degree of commonality of a variable value among the groups. In this classification, the data classification apparatus according to this embodiment further classifies the plurality of records into a plurality of groups in such a manner as to increase the appearance probability, in a group, of a record included in the records belonging to the group. The reduction in the commonality value indicating the degree of commonality of the variable value is synonymous with reduction in the number of the same variable values belonging to different groups.

(Hardware Block Diagram)

Figure 9:
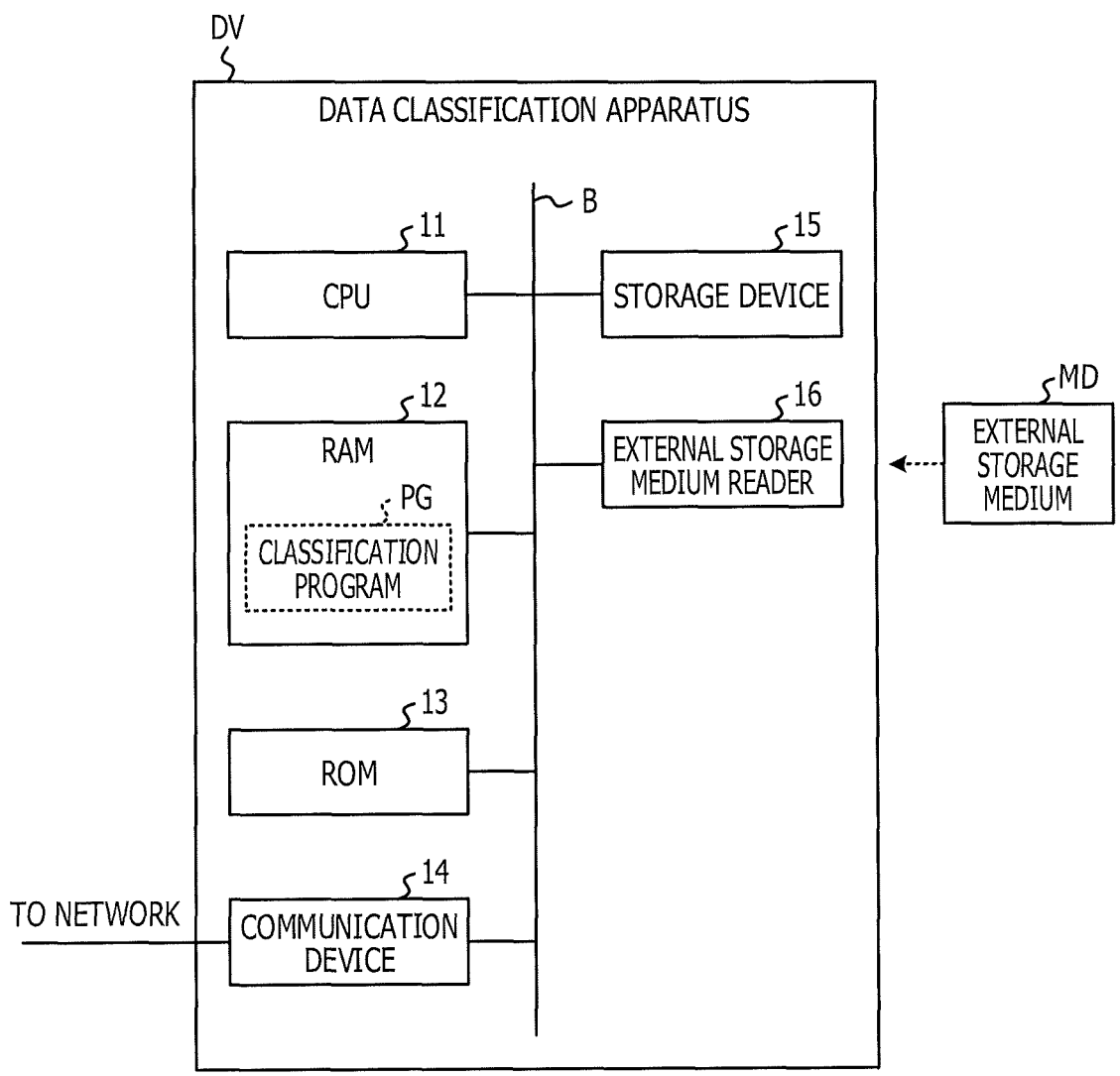
FIG. 9 is a hardware block diagram of a data classification apparatus according to an embodiment.

FIG. 9 is a hardware block diagram of a data classification apparatus DV according to this embodiment. The data classification apparatus DV includes a CPU 11, a RAM 12, a ROM 13, a communication device 14, a storage device 15 and an external storage medium reader 16, which are connected to a bus B. The data classification apparatus DV is an information processing apparatus, for example. Note that CPU stands for "central processing unit", RAM stands for "random access memory", and ROM stands for "read only memory".

The CPU 11 is a central processing unit that controls the entire data classification apparatus DV. The RAM 12 temporarily stores data and the like generated (calculated) in processing to be executed by the CPU 11 and steps to be executed by a classification program PG. The RAM 12 is a semiconductor memory such as a dynamic random access memory (DRAM), for example.

The CPU 11 reads an executable file for the classification program PG from the storage device 15 at start-up of the data classification apparatus DV and decompresses the executable file in the RAM 12 to execute the classification program PG. Note that the executable file may be stored in an external storage medium MD.

The ROM 13 stores various setting information. The communication device 14 has a network interface card (NIC), for example, and connects to a network to execute processing of communicating with other devices. The storage device 15 is a large-capacity storage such as a hard disk drive (HDD) and a solid state drive (SSD), for example.

The external storage medium reader 16 is a device configured to read data stored in the external storage medium MD. The external storage medium MD is a portable storage medium such as a compact disc read only memory (CD-ROM) and a digital versatile disc (DVD) or a portable non-volatile memory such as a USB memory, for example. The external storage medium MD stores discrete data to be classified, for example.

(Software Block Diagram)

Figure 10:
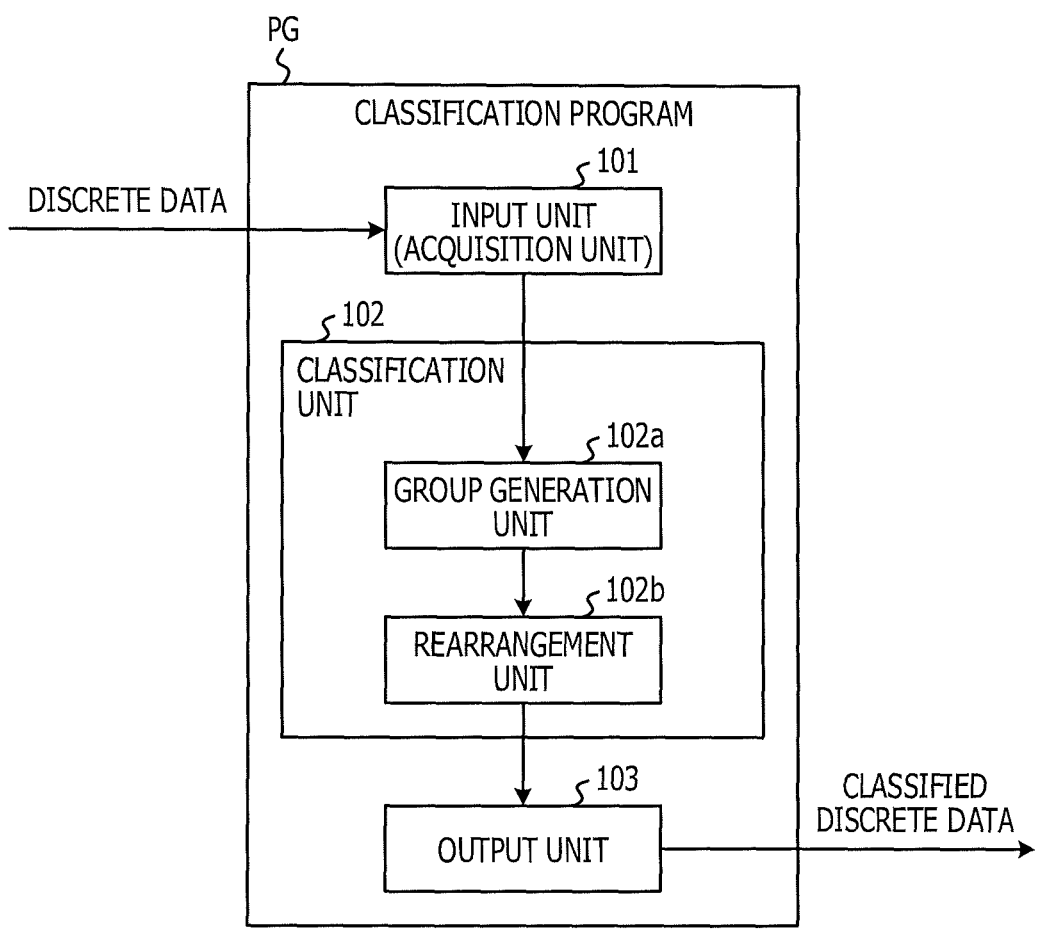
FIG. 10 is a software block diagram of the data classification apparatus.

FIG. 10 is a software block diagram of the data classification apparatus DV illustrated in FIG. 9. The classification program PG includes an input unit (acquisition unit) 101, a classification unit 102, and an output unit 103. Hereinafter, the input unit (acquisition unit) 101 is described as the input unit 101.

The input unit 101 acquires discrete data from other devices or the external storage medium MD and inputs the acquired discrete data to the classification unit 102. The input unit 101 is an example of the acquisition unit configured to acquire data (for example, discrete data) including a plurality of records each including a plurality of kinds of variable values. Note that the other devices are a storage server and the like capable of communicating with the network to which the communication device 14 is connected.

Next, the classification unit 102 is described in detail. The classification unit 102 classifies the plurality of records included in the discrete data acquired by the input unit 101 into a plurality of groups. In the classification, the classification unit 102 classifies the plurality of records into the plurality of groups based on a commonality value indicating a degree of commonality of the variable value among the groups. To be more specific, the classification unit 102 classifies the plurality of records included in the discrete data into the plurality of groups in such a manner as to increase an appearance probability, in a group, of a record included in the records belonging to the group and to reduce the commonality value indicating the degree of commonality of the variable value among the groups.

The classification unit 102 calculates the appearance probability of the record based on an appearance probability, in the group, of the variable value included in the records belonging to the group.

In the calculation of the appearance probability of the record, the classification unit 102 calculates the product of appearance probabilities, in a group to which the record belongs, of respective variable values included in the records belonging to the group, and sets the calculated value of the product as the appearance probability of the record. The classification unit 102 also calculates a commonality value based on the number of the same variable values belonging to different groups and the total number of different variable values belonging to the respective groups. The commonality value corresponds to the number (commonality number) of the same variable values belonging to different groups.

The above-described classification method executed by the classification unit 102 enables classification of discrete data taking into consideration not only the in-group information amount but also the commonality number, as described with reference to FIGS. 7 and 8. As a result, the discrete data may be classified into optimum groups that may easily achieve the analyst's purpose. More specifically, the above-described classification method executed by the classification unit 102 enables the discrete data to be classified into groups corresponding to the analyst's purpose. Furthermore, the above-described classification method also enables optimum groups to be created according to the minimum description length principle, since the classification is performed in such a manner as to minimize the number (commonality number) of the same variable values belonging to different groups.

To be more specific, the classification unit 102 calculates the sum of the reciprocals of the appearance probability of each record. Note that the reciprocal of the appearance probability corresponds to the in-group information amount described with reference to FIGS. 2, 7, 8, and the like.

Furthermore, the classification unit 102 calculates a commonality value for each of the variable values belonging to each of the groups. Then, the classification unit 102 classifies the plurality of records into the plurality of groups in such a manner as to reduce the total sum of the sum of the reciprocals of the appearance probability of each record and the sum of the commonality values of the respective variable values.

A reduction in the sum of the reciprocals of the appearance probability of each record is synonymous with an increase in the sum of the appearance probabilities of the respective records. Therefore, the plurality of records are classified into the plurality of groups in such a manner as to reduce the total sum of the sum of the reciprocals of the appearance probability of each record and the sum of the commonality values of the respective variable values. Accordingly, the discrete data may be classified taking into consideration not only the in-group information amount but also the commonality number. As a result, the discrete data may be classified into the optimum groups.

Here, in the classification of the plurality of records, the classification unit 102 calculates a first sum of the logarithms of the reciprocals of the appearance probability of each record. The classification unit 102 further calculates a second sum of the logarithms of the commonality values of each of the variable values. Then, the classification unit 102 classifies the plurality of records into the plurality of groups in such a manner as to reduce the total sum of the first sum and the second sum.

Note that the reason for calculating the logarithm of the reciprocal of the appearance probability and the logarithm of the commonality value is because the logarithm of the reciprocal of a probability is generally used to calculate a certain information amount (also called an entropy).

The classification unit 102 includes a group generation unit 102a configured to generate initial groups and a rearrangement unit 102b configured to execute rearrangement of records.

The group generation unit 102a generates initial groups as described in S101 in FIG. 3. To be more specific, the group generation unit 102a randomly selects k (k is an integer of 2 or more) records, which share less variable values with each other, from among records included in the discrete data acquired by the input unit 101, thereby creating k groups. Then, the group generation unit 102a generates groups in which records other than the k records among the plurality of records are arranged in the k groups, in such a manner as to increase the appearance probability of the records, which belong to the k groups, appearing in the k groups. Note that k may also be indicated by Na. By the generation of the initial groups, the discrete data is first classified in such a manner as to increase the appearance probability of a record in a group, which is included in the records belonging to the group.

The rearrangement unit 102b executes processing of rearranging records in another second group, the records belonging to a first group among the initial groups generated by the group generation unit 102a. The output unit 103 outputs groups generated after the execution by the rearrangement unit 102b to a terminal TA, for example.

(Flowchart of Discrete Data Classification According to Embodiment)

Figure 11:
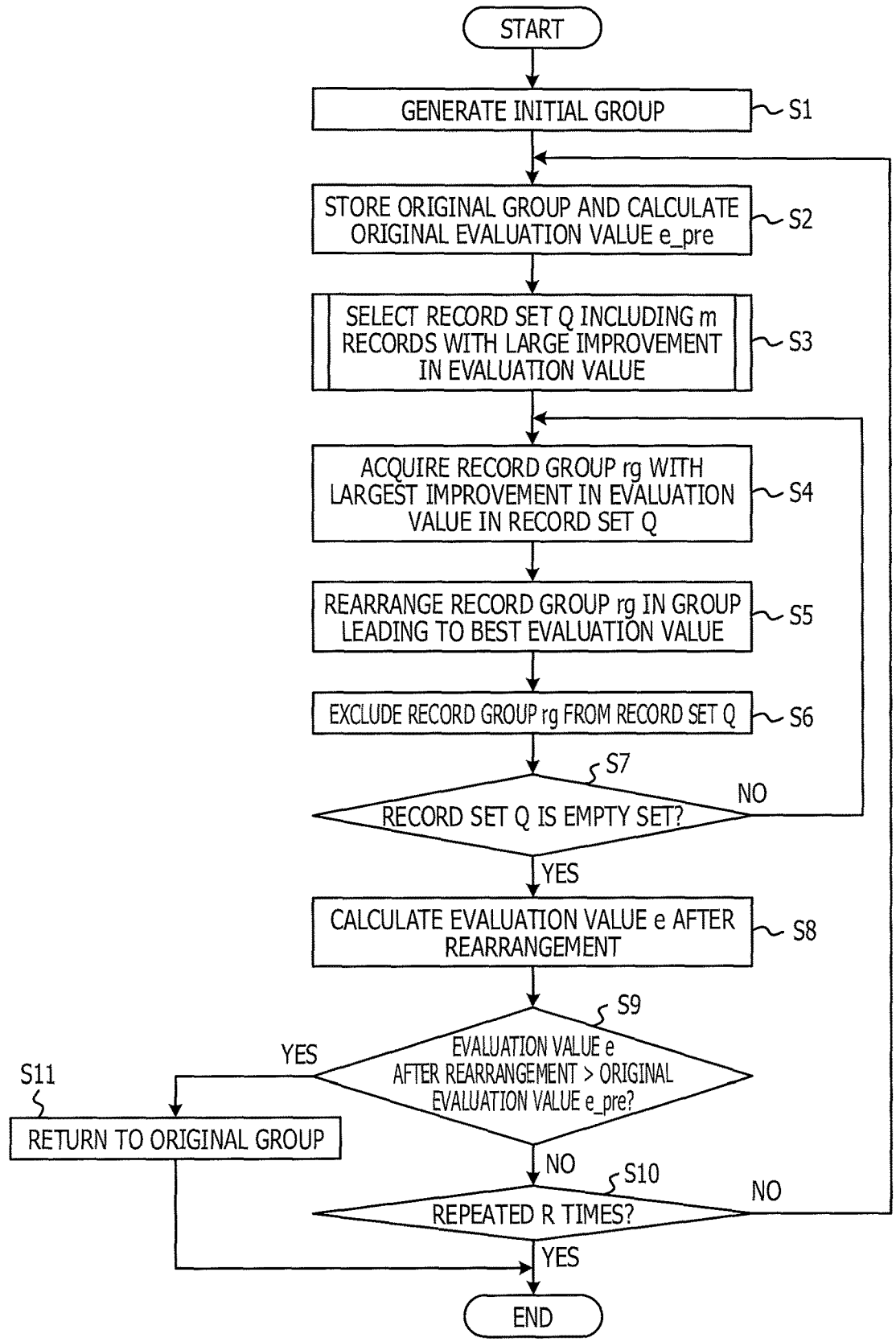
FIG. 11 is a flowchart illustrating a flow of processing of classifying discrete data according to the embodiment.

FIG. 11 is a flowchart illustrating a flow of processing of classifying discrete data according to this embodiment. Prior to S1 in FIG. 11, the input unit 101 acquires discrete data and inputs the acquired discrete data to the group generation unit 102a.

Step S1: the group generation unit 102a classifies a plurality of records included in the discrete data to be classified, thus generating initial groups. S1 is the same as S101 in FIG. 3, and thus detailed description thereof is omitted.

Step S2: the group generation unit 102a or the rearrangement unit 102b stores original groups in the RAM 12, calculates an evaluation value e_pre of the original groups, and stores the evaluation value e_pre in the RAM 12. The evaluation value e_pre is the total sum of the sum of in-group information amounts in the original groups and the sum of inter-group information amounts. The inter-group information amount is described in detail with reference to FIG. 14. The original groups are the initial groups (S1) when S1 is executed for the first time. In the case of second or subsequent execution of S2, the original groups are groups after completion of S5.

When S102 is executed for the first time, the group generation unit 102a executes S102. In the case of second or subsequent execution of S102, the rearrangement unit 102b executes S102. However, in this case, an evaluation value calculated in S8 may be stored as an original evaluation value without calculating an original evaluation value e_pre. Note that the group generation unit 102a or the rearrangement unit 102b stores the groups in the form of a group composition table, for example.

Step S3: the rearrangement unit 102b selects a record set Q including m (m is an integer of 1 or more) records having a large improvement in the evaluation value. The improvement is a value obtained by subtracting an increase (including weighting) in the total number of differences between variable values from a reduction in the in-group information amount. The improvement in the evaluation value is indicated by the following (Formula 1).

$$\text{Improvement in evaluation value} = (\text{reduction in in-group information amount}) - \alpha \times (\text{increase in number of differences between variable values}) \quad \text{(Formula 1)}$$

Note that a is a so-called weighting coefficient, which may be appropriately adjusted by the analyst. S3 is described in detail with a flowchart illustrated in FIG. 12.

Step S4: the rearrangement unit 102b acquires a record group rg having the largest improvement in evaluation value in the record set Q. Note that the record group rg may include one record.

Step S5: the rearrangement unit 102b rearranges the record group rg in a group leading to the best evaluation value.

Step S6: the rearrangement unit 102b excludes the record group rg from the record set Q.

Step S7: the rearrangement unit 102b determines whether or not the record set Q is an empty set. When the record set Q is not the empty set (S7/NO), the processing moves to S4. When the record set Q is the empty set (S7/YES), the processing moves to S8. Note that S7 to S9 are the same as S107 to S109 in FIG. 3, and thus detailed description thereof is omitted.

Step S8: the rearrangement unit 102b calculates an evaluation value e after the rearrangement.

Step S9: the rearrangement unit 102b determines whether or not the evaluation value e after the rearrangement exceeds the original evaluation value e_pre. When the evaluation value e after the rearrangement does not exceed the original evaluation value e_pre (S9/NO), the processing moves to S10. When the evaluation value e after the rearrangement exceeds the original evaluation value e_pre (S9/YES), the processing moves to S11.

Step S10: the rearrangement unit 102b determines whether or not Steps S2 to S3 are repeated R times. When Steps S2 to S3 are repeated R times (S10/YES), the rearrangement unit 102b terminates the processing. The rearrangement unit 102b sets groups after the rearrangement at the end of the processing as groups of the classified discrete data. Then, the rearrangement unit 102b inputs the groups after the rearrangement to the output unit 103. The output unit 103 outputs the groups after the rearrangement inputted from the rearrangement unit 102b to the terminal device TA, for example. When Steps S2 to S3 are not repeated R times (S10/NO), the rearrangement unit 102b moves to S2.

Step S11: the rearrangement unit 102b returns the record group rg rearranged in S5 back to the original group, and sets the groups before the rearrangement as the groups of the classified discrete data. Then, the rearrangement unit 102b inputs the groups before the rearrangement to the output unit 103. The output unit 103 outputs the groups before the rearrangement inputted from the rearrangement unit 102b to the terminal device TA, for example.

Figure 12:
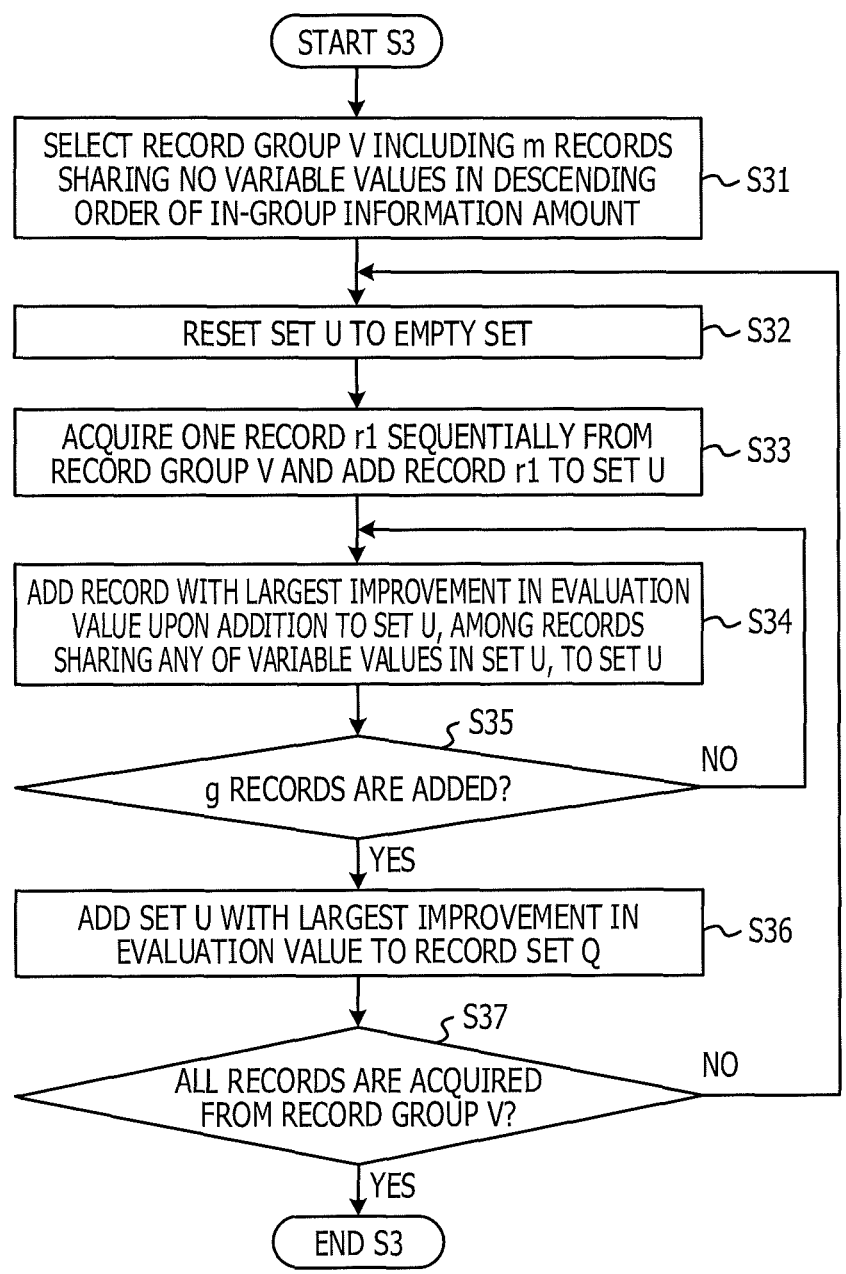
FIG. 12 is a flowchart illustrating a processing flow of Step S3.

FIG. 12 is a flowchart illustrating a processing flow of Step S3 in FIG. 11.

Step S31: the rearrangement unit 102b selects a record group V including m records, which share no variable values with each other, in descending order of in-group information amount from among the records included in the latest group composition table.

Step S32: the rearrangement unit 102b resets a group U to an empty set.

Step S33: the rearrangement unit 102b acquires one record r1 from the record group V and adds the record r1 to the group U.

Step S34: the rearrangement unit 102b selects a record having the largest improvement in evaluation value when the record is added to the group U among the records sharing any of the variable values in the group U, from among the records included in the latest group composition table, and adds the selected record to the group U.

Step S35: the rearrangement unit 102b determines whether or not g (g is an integer of 1 or more) records are added. When the g records are not added (S35/NO), the processing moves to S34. When the g records are added (S35/YES), the processing moves to S36.

Step S36: the rearrangement unit 102b adds the group U when the improvement in evaluation value is the largest to the record set Q.

Step S37: the rearrangement unit 102b determines whether or not all the records are acquired from the record group V. When all the records are not acquired from the record group V (S37/NO), the processing moves to S32. When all the records are acquired from the record group V (S37/YES), S3 is terminated and the processing moves to S4 in FIG. 11.

Specific Examples

Next, with reference to FIGS. 13 to 30, description is given of specific examples of discrete data classification according to this embodiment. FIGS. 13 to 30 are first to eighteenth diagrams illustrating the specific examples according to this embodiment.

Figure 13:
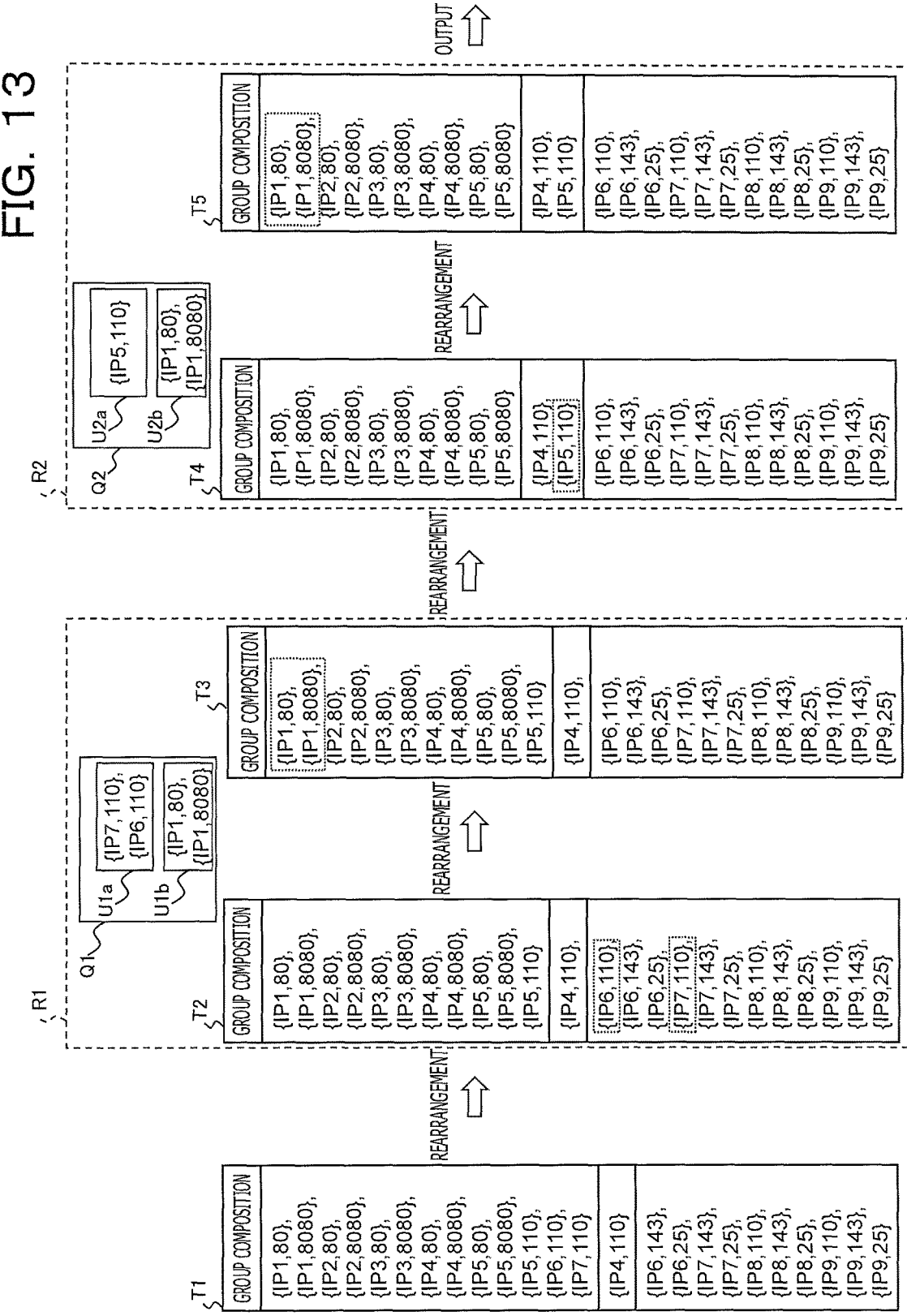
FIG. 13 is a first diagram illustrating a specific example according to the embodiment.

With reference to FIG. 13, an overview of the specific example is described. The overview of the specific example in FIG. 13 schematically illustrates a state where selected records are sequentially rearranged in each group, starting from a group composition table T1 illustrating initial groups. Note that a case where records belonging to a certain group are arranged in the same group (in other words, not moved) is also described with the term "rearrangement".

This rearrangement changes the group composition table T1 into group composition tables T2, T3, T4, and T5. In the group composition tables T1 to T5, records belonging to the respective groups are stored in the cells in the second and subsequent rows. In each of the group composition tables T1 to T5, records belonging to the first group #1 are stored in the cell in the second row below the cell in the first row in which "group composition" is stored. Likewise, records belonging to the second group #2 are stored in the cell in the third row, and records belonging to the third group #3 are stored in the cell in the fourth row.

The group generation unit 102a executes the initial group generation processing (S1) in FIG. 11 on the discrete data LSD4 illustrated in FIG. 2, thus classifying the plurality of records as illustrated in the group composition table T1. Thereafter, the rearrangement unit 102b executes the processing of S2 to S10 in FIG. 11 to rearrange the records.

The records surrounded by the dotted lines in FIG. 13 are the record groups rg described in S4 and S5 in FIG. 11. Moreover, the group composition tables T2 and T3 surrounded by the broken line indicated by reference numeral R1 are group composition tables generated by the rearrangement unit 102b executing the rearrangement (see S5) of record groups U1a and U1b belonging to a record set Q1 (see S3). Likewise, the group composition tables T4 and T5 surrounded by the broken line indicated by reference numeral R2 are group composition tables generated by the rearrangement unit 102b executing the rearrangement (see S5) of record groups U1a and U2b belonging to a record set Q2 (see S3). Note that the group composition tables T1 to T5 are described in detail with reference to FIGS. 14, 19, 20, 26, and 28, respectively.

(Initial Group)

With reference to FIG. 14, initial groups are described. A group composition table T11 illustrated in FIG. 14 is a table obtained by replacing the variable value column in the group composition tables (T104 and T105) illustrated in FIGS. 7 and 8 with an inter-group information amount column. The inter-group information amount column stores an inter-group information amount in the form of "variable value: inter-group information amount of variable value". The variable value is a variable value of a record belonging to a group identified by a group identifier stored in the cell where the group column and the row to which the cell storing the inter-group information amount belongs intersect.

The group generation unit 102a generates initial groups to be described with reference to FIG. 14 (S1). Then, as illustrated in FIG. 14, the group generation unit 102a calculates in-group information amounts and inter-group information amounts of all the records (S2). Furthermore, the group generation unit 102a calculates an original evaluation value e_pre (48.3) by adding the total sum (27.2) of the in-group information amounts and the total sum (21.1) of the inter-group information amounts (S2). S1 and S2 are described below. Note that the initial groups are described in S101 in FIG. 3 and the in-group information amount is described with reference to FIG. 2, and thus description thereof is omitted.

In the example illustrated in FIG. 14, variable values of the records belonging to the first group #1 are as follows. Specifically, the variable values are IP1, IP2, IP3, IP4, IP5, IP6, IP7, 80, 8080, and 110.

The inter-group information amount of a certain variable value (hereinafter described as variable value X) is the logarithm of the reciprocal of an appearance probability of variable value X indicating the probability of variable value X appearing in a certain group. The appearance probability of variable value X is a value obtained by dividing the number of groups including variable value X by the total number of different variable values belonging to the respective groups. The inter-group information amount is an example of the degree of commonality of the variable value, for example, described with reference to FIG. 10.

In FIG. 14, an inter-group information amount of the variable value IP1 (see the dotted frame) in the first group #1 is calculated. Since a group including the variable value IP1 in the first group #1 is the first group #1, the number of groups including the variable value IP1 in the first group #1 is one.

Moreover, different variable values belonging to the first group #1 are as follows. Specifically, the variable values are IP1, IP2, IP3, IP4, IP5, IP6, IP7, 80, 8080, and 110. Therefore, the number of the different variable values belonging to the first group #1 is 10. Also, different variable values belonging to the second group #2 are IP4 and 110. Therefore, the number of the different variable values belonging to the second group #2 is 2. Moreover, different variable values belonging to the third group #3 are IP6, IP7, IP8, IP9, 110, 143 and 25. Therefore, the number of the different variable values belonging to the third group #3 is 7. Thus, the total number of the different variable values belonging to the respective groups is 19 (10+2+7).

Therefore, the appearance probability of the variable value IP1, which is included in the first group #1, appearing in the first group #1 is (1/19). Also, the inter-group information amount of the variable value IP1 included in the first group #1 is $-\log(1/19)$ (see the dotted frame).

Then, an inter-group information amount of the variable value 110 (see the dashed-dotted line frame) included in the third group #3 is calculated. Since groups including the variable value 110 in the third group #3 are the first group #1, the second group #2 and the third group #3, the number of the groups including the variable value 110 in the first group #1 is 3. As described above, the total number of the different variable values belonging to the respective groups is 19 (10+2+7).

Therefore, the appearance probability of the variable value 110, which is included in the first group #1, appearing in the first group #1 is (3/19). Also, the inter-group information amount of the variable value 110 included in the first group #1 is $-\log(3/19)$ (see the dashed-dotted line frame).

The sum of the inter-group information amounts of the variable values in the records belonging to the k-th (the lowercase letter k is an integer of 1 or more) group #k is illustrated below the cell that stores the inter-group information amount. For example, the sum of the inter-group information amounts of the variable values in the records belonging to the first group #1 is "11.4". To be more specific, the total sum is $(-\log(1/19))+(-\log(1/19))+(-\log(1/19))+(-\log(2/19))+(-\log(1/19))+(-\log(2/19))+(-\log(2/19))+(-\log(1/19))+(-\log(1/19))+(-\log(3/19))$.

In the group composition table T11, the cell at which the second row from the bottom intersects with the inter-group information amount column stores the total sum of the inter-group information amounts of the variable values in all the groups. For example, the sums of the inter-group information amounts of the variable values in the first to third groups #1 to #3 are "11.4", "1.8" and "7.9". Therefore, the total sum is "21.1" (11.4+1.8+7.9).

Thereafter, the rearrangement unit 102b selects one or more records with the largest reduction in the total sum of a first sum and a second sum, when the records are arranged in different groups, from among the records belonging to the k groups. The first sum is the sum of the in-group information amounts, for example. The second sum is the sum of the inter-group information amounts, for example. The rearrangement unit 102b arranges the selected one or more records from the group (for example, the first group) to which the selected one or more records belong to the group (for example, the second group) with the largest reduction in the total sum of the first sum and the second sum.

(Selection of Record Set to be Rearranged)

Figure 15:
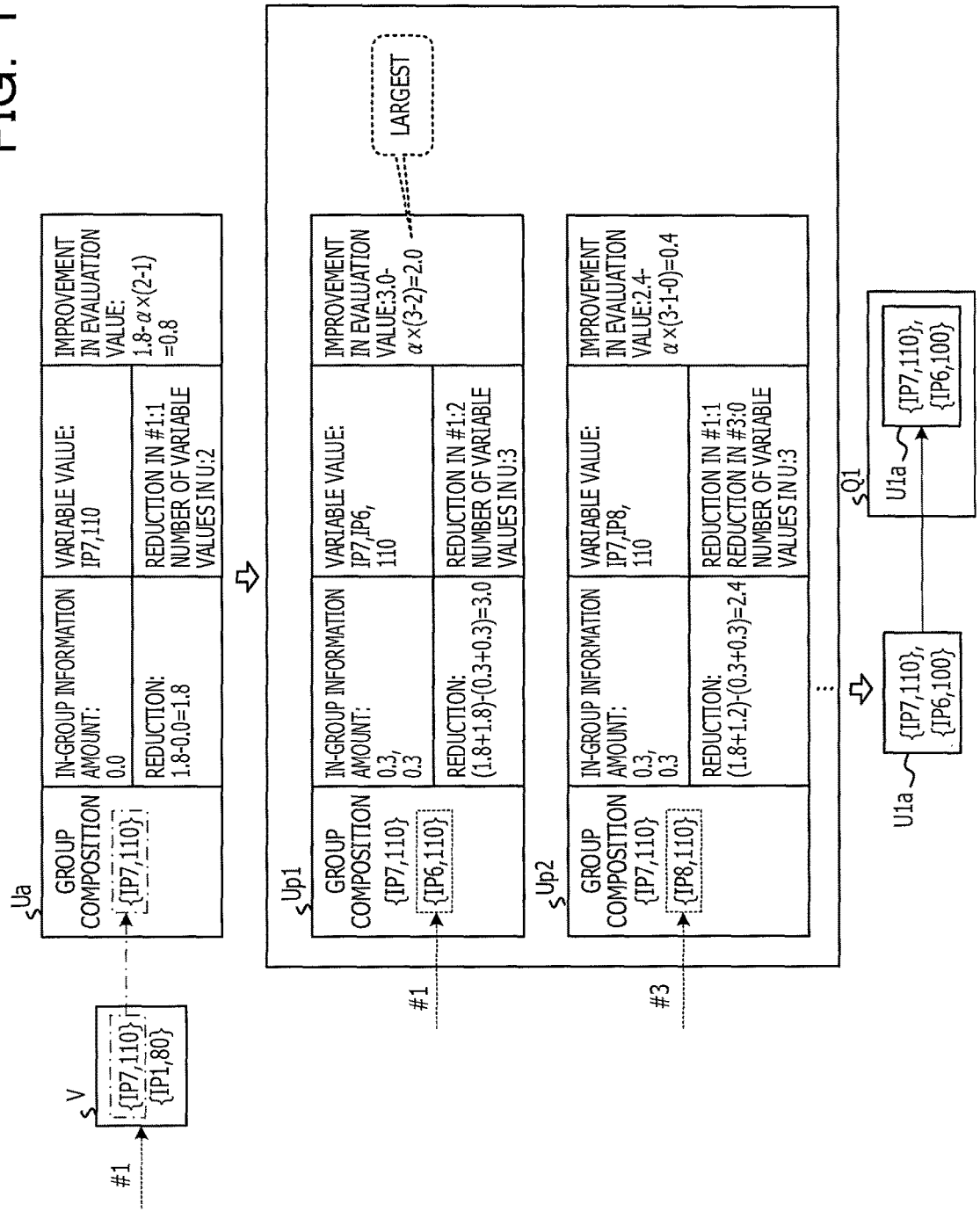
FIG. 15 is a third diagram illustrating a specific example according to the embodiment.
Figure 16:
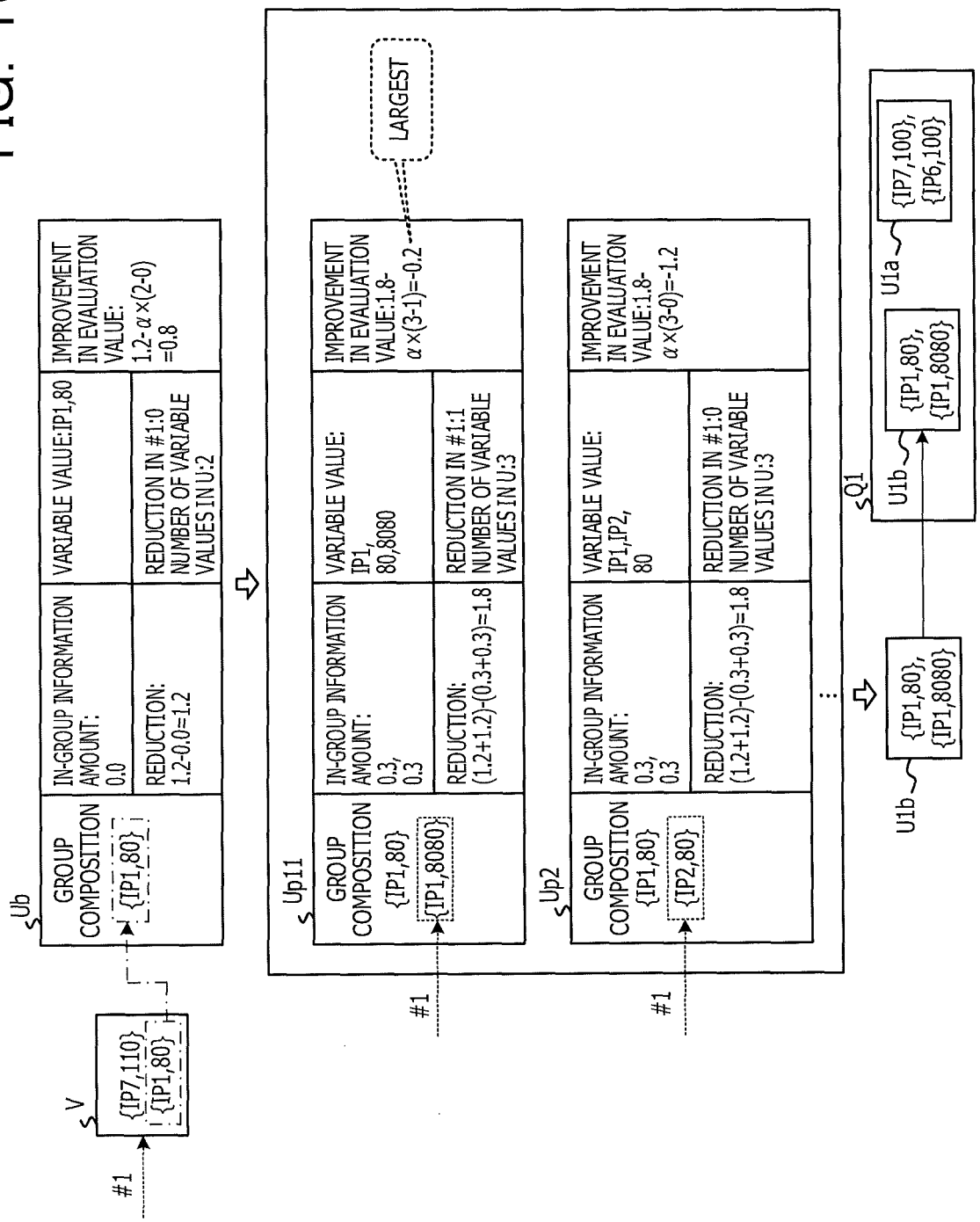
FIG. 16 is a fourth diagram illustrating a specific example according to the embodiment.

Next, with reference to FIGS. 14 to 16, selection of a record set Q (S3) is described. The rearrangement unit 102b selects a record group V including m records, which share no variable values with each other, in descending order of in-group information amount from among the records included in the latest group composition table (in other words, the original groups). The latest group composition table is the group composition table T11 illustrated in FIG. 14. The rearrangement unit 102b selects a record group V including m records {IP7, 110} and {IP1, 80}, which share no variable values with each other, in descending order of in-group information amount, from among the records included in the group composition table T11 illustrated in FIG. 14 (S31). In this step, m is 2.

Here, in the group composition table T11 illustrated in FIG. 14, the largest in-group information amount is 1.8 $(-\log\{(1/13)*(3/13)\})$. Note that, in calculation of the logarithm, the second decimal place is rounded off.

The records having the largest in-group information amount (1.8) are two records {IP7, 110} and {IP6, 110} (see the dashed-two dotted line frame in FIG. 14) belonging to the first group #1. The records {IP7, 110} and {IP6, 110} share the variable value 110. Therefore, the rearrangement unit 102b selects one record, for example, the record {IP7, 110} from the records {IP7, 110} and {IP6, 110}.

A record which belongs to the first group #1 and does not share the variable value of the selected record {IP7, 110} and which has the second largest in-group information amount after the largest in-group information amount (1.8) is the record {IP1, 80}, for example. The second largest in-group information amount after the largest in-group information amount (1.8) is 1.2 $(-\log\{(2/13)*(5/13)\})$. Therefore, the rearrangement unit 102b selects the record {IP1, 80}.

Through the above selection processing, the rearrangement unit 102b selects the two records {IP7, 110} and {IP1, 80} (S31). Then, the rearrangement unit 102b resets the set U to an empty set (S32). Hereinafter, the set U after the reset is described as a set Ua. With reference to FIG. 15, creation of the set Ua is described.

The rearrangement unit 102b acquires one record r1 (for example, {IP7, 110}) sequentially from the record group V including the two records {IP7, 110} and {IP1, 80}, and adds the record r1 to the group Ua (S33). In FIG. 15, the record {IP7, 110} is indicated by the dashed-dotted line frame, while the addition is indicated by the dashed-dotted arrow. Note that the record {IP7, 110} is the record belonging to the first group #1 in the group composition table T11 illustrated in FIG. 14 (see the dotted arrow indicated by "#1" in the record group V in FIG. 15).

The state where the record {IP7, 110} is added to the group Ua is indicated by "group composition: {IP7, 110}" in a cell of the group Ua. The rearrangement unit 102b calculates the in-group information amount 0.0 of the record {IP7, 110} in the group Ua. Note that the in-group information amount of the record {IP7, 110} in the group Ua is 0.0 (−log{(1/1)*(1/1)}).

This calculation is indicated by "in-group information amount: 0.0" in a cell of the group Ua. The variable values of the record {IP7, 110} belonging to the group Ua are IP7 and 110. These variable values are indicated by "variable value: IP7, 110" in a cell of the group Ua.

When a record belonging to group X is rearranged in another group (appropriately described as group Y), it is preferable that the total sum of the in-group information amounts is reduced as much as possible. Therefore, it is considered how much the in-group information amount is reduced by rearranging the record belonging to group X in group Y.

For example, by rearranging the record {IP7, 110} belonging to the first group #1 in the group Ua, the in-group information amount (1.8) of the record {IP7, 110} in the first group #1 is reduced, and the in-group information amount of the group Ua is increased by 0.0. Note that the increase in in-group information amount by 0.0 is synonymous with no increase in in-group information amount.

Therefore, by rearranging the record {IP7, 110} in the group Ua, the total in-group information amount in the first to third groups #1 to #3 in the group composition table T11 illustrated in FIG. 14 and the group Ua illustrated in FIG. 15 is reduced by 1.8 (1.8−0.0). This reduction is indicated by "reduction: 1.8−0.0=1.8" in a cell of the group Ua.

When a record belonging to group X is rearranged in another group (appropriately described as group Y), it is preferable that the commonality number of the variable values is reduced. Therefore, it is considered how much the variable values are reduced by rearranging the record belonging to group X in group Y. In the reduction in variable value, when the rearrangement of the record in group Y causes the same variable values as n (n is an integer of 1 or more) variable values included in the record to be excluded from the variable values in group X, the n variable values are considered to be reduced by n.

In FIG. 14, when the record {IP7, 110} belonging to the first group #1 is rearranged in the group Ua, the same variable value as the variable value IP7 is excluded from the variable values in the first group #1. However, even after the rearrangement, the variable value 110 is included in the variable values in the first group #1. Therefore, when the record {IP7, 110} belonging to the first group #1 is rearranged in the group Ua, the number of the variable values is reduced by 1. This reduction is indicated by "reduction in #1:1" in a cell of the group Ua.

Here, the number of the variable values in the group Ua to which the record {IP7, 110} belongs is 2. This number of the variable values is indicated by "number of variable values in U: 2" in a cell of the group Ua.

Here, consideration is made on an improvement in evaluation value when the record belonging to group X is rearranged in group Y. It is preferable that this rearrangement increases the improvement in evaluation value indicated by (Formula 1).

The improvement is indicated by (reduction in in-group information amount)−α×(increase in number of differences between variable values). Here, an increase in the total number of differences between the variable values is a value obtained by subtracting the reduction in the number of variable values from the number of the variable values in the group U.

The improvement in evaluation value when the record {IP7, 110} belonging to the first group #1 is rearranged in the group Ua is 0.8 (1.8−α×(2−1) where a is 1). "1.8" is a reduction value of the in-group information amount. "2" in "(2−1)" is the number of the variable values in the group Ua to which the record {IP7, 110} belongs. "1" is the reduction in the variable values. The value of a is adjustable. The analyst adjusts the value of a to change the influence of the inter-group information amount on the evaluation value. Adjusting the value of a changes the contents of the records included in each group. The analyst adjusts the value of a, causes the data classification apparatus DV to classify discrete data, and observes changes in the contents of the records. Then, while observing such changes, the analyst causes the data classification apparatus DV to classify the discrete data in such a manner as to conform to the analyst's intention, thereby obtaining a discrete data classification result that conforms to the analyst's intention.

The rearrangement unit 102b executes calculation of the in-group information amount in the group Ua and calculation of the improvement in evaluation value, and stores the calculation results in the RAM 12.

Next, the rearrangement unit 102b adds a record to the group Ua, the record having the largest improvement in evaluation value when the record is added to the group Ua among the records sharing any of the variable values in the group Ua (S34). It is assumed, for example, that the record sharing any of the variable values (IP7 or 110) in the group Ua is {IP6, 110}. This record is the record belonging to the first group #1 in the group composition table T11 illustrated in FIG. 14 (see the dotted arrow indicated by "#1" in the group Up1 in FIG. 15).

It is assumed that the record {IP6, 110} belonging to the first group #1 is added to the group Ua. The state where the record {IP6, 110} is added to the group Ua is indicated by "group composition: {IP7, 110}, {IP6, 110}" in a cell of the group Up1. The rearrangement unit 102b calculates the in-group information amount 0.3 in the group Up1 of the records (IP7, 110) and {IP6, 110}. This calculation formula is −log{(1/2)*(2/2)}. Note that the value of −log{(1/2)*(2/2)} is 0.3.

This calculation is indicated by "in-group information amount: 0.3, 0.3" in a cell of the group Up1. The variable values in the records {IP7, 110} and {IP6, 110} belonging to the group Up1 are IP7, IP6 and 110. These variable values are indicated by "variable value: IP7, IP6, 110" in a cell of the group Up1.

By rearranging the records {IP7, 110} and {IP6, 110} belonging to the first group #1 in the group Up1, the in-group information amount (1.8) of the record {IP7, 110} in the first group #1 and the in-group information amount (1.8) of the record {IP6, 110} in the first group #1 are reduced. This rearrangement increases the in-group information amount of the group Up1 by 0.6 (0.3+0.3). Therefore, by rearranging the records {IP7, 110} and {IP6, 110} in the group Up1, the total in-group information amount in the first to third groups #1 to #3 in the group composition table T11 illustrated in FIG. 14 and the group Up1 illustrated in FIG. 15 is reduced by 3.0 ((1.8+1.8)−(0.3+0.3)). This reduction is indicated by "reduction: (1.8+1.8)−(0.3+0.3) =3.0" in a cell of the group Up1.

In FIG. 14, when the records {IP7, 110} and {IP6, 110} are rearranged from the first group #1 to the group Up1, the same variable values IP7 and IP6 as the variable values IP7 and IP6 are excluded from the variable values in the first group #1. However, even after the rearrangement, the variable 110 is included in the variable values in the first group #1. Therefore, when the records {IP7, 110} and {IP6, 110} belonging to the first group #1 are rearranged in the group Up1, the number of the variable values is reduced by 2. This reduction is indicated by "reduction in #1: 2" in a cell of the group Up1.

Here, the number of the variable values in the group Up1 to which the records {IP7, 110} and {IP6, 110} belong is 3. This number of the variable values is indicated by "number of variable values in U: 3" in a cell of the group Up1.

The improvement in evaluation value when the records {IP7, 110} and {IP6, 110} belonging to the first group #1 are rearranged in the group Up1 is 2.0 (3.0−α×(3−2) where α is 1).

The rearrangement unit 102b executes calculation of the in-group information amount in the group Up1 and calculation of the improvement in evaluation value, and stores the calculation results in the RAM 12.

It is assumed that the record {IP8, 110} belonging to the third group #3 is added to the group Ua (see the dotted arrow indicated by "#3" in the group Up2 in FIG. 15). The state where the record {IP8, 110} is added to the group Ua is indicated by "group composition: {IP7, 110}, {IP8, 110}" in a cell of the group Up2. The rearrangement unit 102b calculates the in-group information amount 0.3 in the group Up2 of the records (IP7, 110) and {IP8, 110}. This calculation formula is −log{(1/2)*(2/2)}. Note that the value of −log{(1/2)*(2/2)} is 0.3.

This calculation is indicated by "in-group information amount: 0.3, 0.3" in a cell of the group Up2. The variable values in the records {IP7, 110} and {IP8, 110} belonging to the group Up2 are IP7, IP8 and 110. These variable values are indicated by "variable value: IP7, IP8, 110" in a cell of the group Up2.

The record {IP7, 110} is rearranged from the first group #1 to the group Up2, and the record {IP8, 110} is rearranged from the third group #3 to the group Up2. This rearrangement reduces the in-group information amount (1.8) of the record {IP7, 110} in the first group #1 and the in-group information amount (1.2) of the record {IP8, 110} in the third group #3, and increases the in-group information amount of the group Up2 by 0.6 (0.3+0.3). Note that the in-group information amount of the record {IP8, 110} in the third group #3 is 1.2 (−log{(3/10)*(2/10)}).

Therefore, by rearranging the records {IP7, 110} and {IP8, 110} in the group Up2, the total in-group information amount in the first to third groups #1 to #3 in the group composition table T11 illustrated in FIG. 14 and the group Up2 illustrated in FIG. 15 is reduced by 2.4 ((1.8+1.2)−(0.3+0.3)). This reduction is indicated by "reduction: (1.8+1.2)−(0.3+0.3)=2.4" in a cell of the group Up2.

When the record {IP7, 110} belonging to the first group #1 is rearranged in the group Up2, the same variable value IP7 as the variable value IP7 is excluded from the variable values in the first group #1. Therefore, when the record {IP7, 110} belonging to the first group #1 is rearranged in the group Up2, the number of the variable values is reduced by 1. This reduction is indicated by "reduction in #1: 1" in a cell of the group Up2.

When the record {IP8, 110} belonging to the third group #3 is rearranged in the group Up2, the same variable values IP8 and 110 as the variable values IP8 and 110 are not excluded from the variable values in the third group #3. Therefore, when the record {IP8, 110} belonging to the third group #3 is rearranged in the group Up2, the number of the variable values is not reduced. This no reduction is indicated by "reduction in #3: 0" in a cell of the group Up2.

Here, the number of the variable values in the group Up2 to which the records {IP7, 110} and {IP8, 110} belong is 3. This number of the variable values is indicated by "number of variable values in U: 3" in a cell of the group Up2.

The improvement in evaluation value when the record {IP7, 110} belonging to the first group #1 and the record {IP8, 110} belonging to the third group #3 are rearranged in the group Up2 is 0.4 (2.4−α×(3−1−0) where a is 1).

The rearrangement unit 102b executes calculation of the in-group information amount in the group Up2 and calculation of the improvement in evaluation value, and stores the calculation results in the RAM 12.

As described above, the improvement in evaluation value when the record {IP6, 110} is added to the group Ua is 2.0, which is the largest (see the balloon "largest" in FIG. 15). Then, the rearrangement unit 102b adds the record {IP6, 110} to the group Ua (S34).

The rearrangement unit 102b determines whether or not g (g is 1, for example) record is added (S35). Since one record is already added to the group Ua (S35/YES), the rearrangement unit 102b adds the group Up1 with the largest improvement in evaluation value to the record set Q1 (S36). Hereinafter, a group of two records included in the group Up1 with the largest improvement in evaluation value is indicated by a group U1a.

The rearrangement unit 102b acquires one record r1 ({IP7, 110}) sequentially from the record group V including the two records {IP7, 110} and {IP1, 80}, and thus does not acquire all the records from the record group V (S37/NO). Therefore, the rearrangement unit 102b resets the set U to an empty set (S32). Hereinafter, the set U after the reset is described as a set Ub. With reference to FIG. 16, creation of the set Ub is described.

The rearrangement unit 102b acquires one record r1 (for example, {IP1, 80}) sequentially from the record group V including the two records {IP7, 110} and {IP1, 80}, and adds the record r1 to the group Ub (S33). In FIG. 16, the record {IP1, 80} is indicated by the dashed-dotted line frame, while the addition is indicated by the dashed-dotted arrow. Note that the record {IP1, 80} is the record belonging to the first group #1 in the group composition table T11 illustrated in FIG. 14 (see the dotted arrow indicated by "#1" in the record group V in FIG. 16).

The state where the record {IP1, 80} is added to the group Ub is indicated by "group composition: {IP1, 80}" in a cell of the group Ub. The rearrangement unit 102b calculates the in-group information amount 0.0 of the record {IP1, 80} in the group Ub. This calculation is indicated by "in-group information amount: 0.0" in a cell of the group Ub. The variable values of the record {IP1, 80} belonging to the group Ub are IP1 and 80. These variable values are indicated by "variable value: IP1, 80" in a cell of the group Ub.

For example, by rearranging the record {IP1, 80} belonging to the first group #1 in the group Ub, the in-group information amount (1.2) of the record {IP1, 80} in the first group #1 is reduced, and the in-group information amount of the group Ub is increased by 0.0. Note that the in-group information amount of the record {IP1, 80} in the first group #1 is 1.2 (−log{(2/13)*(5/13)}).

Therefore, by rearranging the record {IP1, 80} in the group Ub, the total in-group information amount in the first to third groups #1 to #3 in the group composition table T11 illustrated in FIG. 14 and the group Ub illustrated in FIG. 16 is reduced by 1.2 (1.2−0.0). This reduction is indicated by "reduction: 1.2−0.0=1.2" in a cell of the group Ub.

Even when the record {IP1, 80} belonging to the first group #1 is rearranged in the group Ub, the variable values IP1 and 80 are included in the variable values in the first group #1. Therefore, when the record {IP1, 80} belonging to the first group #1 is rearranged in the group Ub, the number of the variable values is not reduced. This no reduction is indicated by "reduction in #1: 0" in a cell of the group Ub.

Here, the number of the variable values in the group Ub to which the records {IP1, 80} belongs is 2. This number of the variable values is indicated by "number of variable values in U: 2" in a cell of the group Ub.

The improvement in evaluation value when the record {IP1, 80} belonging to the first group #1 is rearranged in the group Ub is −0.8 (1.2−α×(2−0) where a is 1). "1.2" is a reduction value of the in-group information amount. "2" in "(2−0)" is the number of the variable values in the group Ub to which the record {IP1, 80} belongs. "0" is the reduction in the variable values.

The rearrangement unit 102b executes calculation of the in-group information amount in the group Ub and calculation of the improvement in evaluation value, and stores the calculation results in the RAM 12.

Next, the rearrangement unit 102b adds a record to the group Ub, the record having the largest improvement in evaluation value when the record is added to the group Ub among the records sharing any of the variable values in the group Ub (S34). It is assumed, for example, that the record sharing any of the variable values (IP1 or 80) in the group Ub is {IP1, 8080}. This record is the record belonging to the first group #1 in the group composition table T11 illustrated in FIG. 14.

It is assumed that the record {IP1, 8080} is added to the group Ub (see the dotted arrow indicated by "#1" in a group Up11 in FIG. 16). The state where the record {IP1, 8080} is added to the group Ub is indicated by "group composition: {IP1, 80}, {IP1, 8080}" in a cell of the group Up11. The rearrangement unit 102b calculates the in-group information amount 0.3 in the group Up1 of the records (IP1, 80) and {IP1, 8080} in the group Up11. This calculation formula is −log{(1/2)*(2/2)}. Note that the value of −log{(1/2)*(2/2)} is 0.3.

This calculation is indicated by "in-group information amount: 0.3, 0.3" in a cell of the group Up11. The variable values in the records {IP1, 80} and {IP1, 8080} belonging to the group Up11 are IP1, 80, and 8080. These variable values are indicated by "variable value: IP1, 80, 8080" in a cell of the group Up11.

By rearranging the records {IP1, 80} and {IP1, 8080} belonging to the first group #1 in the group Up11, the in-group information amount (1.2) of the record {IP1, 80} in the first group #1 and the in-group information amount (1.2) of the record {IP1, 8080} in the first group #1 are reduced. This rearrangement increases the in-group information amount of the group Up11 by 0.6 (0.3+0.3).

Therefore, by rearranging the records {IP1, 80} and {IP1, 8080} in the group Up11, the total in-group information amount in the first to third groups #1 to #3 in the group composition table T11 illustrated in FIG. 14 and the group Up11 illustrated in FIG. 16 is reduced by 1.8 ((1.2+1.2)−(0.3+0.3)). This reduction is indicated by "reduction: (1.2+1.2)−(0.3+0.3)=1.8" in a cell of the group Up11.

In FIG. 14, when the records {IP1, 80} and {IP1, 8080} belonging to the first group #1 are rearranged in the group Up11, the same variable value IP1 as the variable value IP1 is excluded from the variable values in the first group #1. However, even after the rearrangement, the variables 80 and 8080 are included in the variable values in the first group #1. Therefore, when the records {IP1, 80} and {IP1, 8080} belonging to the first group #1 are rearranged in the group Up11, the number of the variable values is reduced by 1. This reduction is indicated by "reduction in #1: 1" in a cell of the group Up11.

Here, the number of the variable values in the group Up11 to which the records {IP1, 80} and {IP1, 8080} belong is 3. This number of the variable values is indicated by "number of variable values in U: 3" in a cell of the group Up11.

The improvement in evaluation value when the records {IP1, 80} and {IP1, 8080} belonging to the first group #1 are rearranged in the group Up11 is −0.2 (1.8−α×(3−1) where α is 1).

The rearrangement unit 102b executes calculation of the in-group information amount in the group Up11 and calculation of the improvement in evaluation value, and stores the calculation results in the RAM 12.

It is assumed that the record {IP2, 80} belonging to the first group #1 is added to the group Ub (see the dotted arrow indicated by "#1" in a group Up12 in FIG. 16). The state where the record {IP2, 80} is added to the group Ub is indicated by "group composition: {IP1, 80}, {IP2, 80}" in a cell of the group Up2. The rearrangement unit 102b calculates the in-group information amount 0.3 in the group Up12 of the records (IP1, 80) and {IP2, 80} in the group Up12. This calculation formula is −log{(1/2)*(2/2)}. Note that the value of −log{(1/2)*(2/2)} is 0.3.

This calculation is indicated by "in-group information amount: 0.3, 0.3" in a cell of the group Up12. The variable values in the records {IP1, 80} and {IP2, 80} belonging to the group Up12 are IP1, IP2, and 80. These variable values are indicated by "variable value: IP1, IP2, 80" in a cell of the group Up12.

By rearranging the records {IP1, 80} and {IP2, 80} belonging to the first group #1 in the group Up12, the in-group information amount (1.2) of the record {IP1, 80} in the first group #1 and the in-group information amount (1.2) of the record {IP2, 80} in the first group #1 are reduced. This rearrangement increases the in-group information amount of the group Up12 by 0.6 (0.3+0.3). Note that the in-group information amount of the record {IP2, 80} in the first group #1 is 1.2 (−log{(2/13)*(5/13)}).

Therefore, by rearranging the records {IP1, 80} and {IP2, 80} in the group Up12, the total in-group information amount in the first to third groups #1 to #3 in the group composition table T11 illustrated in FIG. 14 and the group Up12 illustrated in FIG. 16 is reduced by 1.8 ((1.2+1.2)−(0.3+0.3)). This reduction is indicated by "reduction: (1.2+1.2)−(0.3+0.3)=1.8" in a cell of the group Up12.

Even when the records {IP1, 80} and {IP2, 80} belonging to the first group #1 are rearranged in the group Up12, the same variable values IP1, IP2, and 80 as the variable values IP1, IP2, and 80 are not excluded from the variable values in the first group #1. Therefore, even when the records {IP1, 80} and {IP2, 80} belonging to the first group #1 are rearranged in the group Up12, the number of the variable values is not reduced. This no reduction is indicated by "reduction in #1: 0" in a cell of the group Up12.

Here, the number of the variable values in the group Up12 to which the records {IP1, 80} and {IP2, 80} belong is 3.

This number of the variable values is indicated by "number of variable values in U: 3" in a cell of the group Up12.

The improvement in evaluation value when the records {IP1, 80} and {IP2, 80} belonging to the first group #1 are rearranged in the group Up12 is −1.2 (1.8−α×(3−0) where a is 1).

The rearrangement unit 102b executes calculation of the in-group information amount in the group Up12 and calculation of the improvement in evaluation value, and stores the calculation results in the RAM 12.

The improvement in evaluation value when the record {IP1, 8080} is added to the group Ub is −0.2, which is the largest (see the balloon "largest" in FIG. 16). Then, the rearrangement unit 102b adds the record {IP1, 8080} to the group Ub (S34).

The rearrangement unit 102b determines whether or not g (g is 1, for example) record is added (S35). Since one record is already added to the group Ua (S35/YES), the rearrangement unit 102b adds the group Up11 with the largest improvement in evaluation value to the record set Q1 (S36). Hereinafter, a group of two records included in the group Up11 with the largest improvement in evaluation value is indicated by a group U1b.

As described with reference to FIGS. 12, 15 and 16, in selection of one or more records to be rearranged, the rearrangement unit 102b selects records, which share no variable values with each other, in descending order of the logarithm of the reciprocal of appearance probability (for example, the in-group information amount). In the examples illustrated in FIGS. 15 and 16, the rearrangement unit 102b selects a record group V including the records {IP7, 110} and {IP1, 80} (S31).

Then, the rearrangement unit 102b executes first addition processing to add the selected first record (for example, the record {IP7, 110} in FIG. 15) to a group (for example, the group Ua in FIG. 15) other than the k groups (S33). Thereafter, the rearrangement unit 102b selects a second record (for example, the record {IP6, 110} in FIG. 15) including any one of the variable values included in the first record, from among the records included in the discrete data LSD4 (S33). The rearrangement unit 102b executes second addition processing to add the selected second record to the other group Ua (S33).

The rearrangement unit 102b estimates a reduction in a first sum and a second sum every time a record is added to another group. Note that the first sum is the sum of the logarithms (for example, in-group information amounts) of the reciprocals of an appearance probability of each of the records. The second sum is the sum of the logarithms of the commonality value of each of the variable values.

In this estimation, the rearrangement unit 102b calculates the improvement in evaluation value in FIG. 15, for example. The rearrangement unit 102b selects another group (for example, the record group U1a in FIG. 15) when the largest subtraction value is estimated as one or more records to be rearranged.

By selecting another group when the largest subtraction value is estimated as one or more records to be rearranged, records with the largest reduction in evaluation value may be selected.

In the estimation of the reduction, the rearrangement unit 102b executes the following calculation processing every time a record is added to another group. More specifically, the rearrangement unit 102b calculates a first sum of the logarithms (for example, in-group information amounts) of the reciprocals of appearance probabilities of one or more third records, which belong to other groups, in the k groups.

Then, the rearrangement unit 102b calculates a second sum of the logarithms (for example, in-group information amounts) of the reciprocals of appearance probabilities of the third records in other groups. Thereafter, the rearrangement unit 102b calculates a first value by subtracting the second sum from the first sum.

Next, the rearrangement unit 102b calculates a second value by subtracting the number of variable values included in the third record when the variable values are excluded from a group to which the third record belongs, when each of the third records is excluded from the group, from the total number of different variable values included in other groups.

The rearrangement unit 102b calculates a subtraction value obtained by subtracting the second value from the first value, and sets the subtraction value as the estimate of reduction. This estimate of reduction is the improvement in evaluation value. In the calculation of the subtraction value, the rearrangement unit 102b sets a value obtained by subtracting a value, which is obtained by multiplying the second value by a weighting coefficient, from the first value, as the subtraction value. The weighting coefficient is a (for example, 1) described with reference to FIGS. 15 and 16, which is adjustable, for example.

Here, in the example illustrated in FIG. 15, a case where the record {IP7, 110} is added to the group U (see the group Ua) is assumed to be a first case. Also, in the example illustrated in FIG. 15, a case where the record {IP6, 110} is added to the group Ua (see the group Up1) is assumed to be a second case.

In the first case, as in the examples illustrated in FIGS. 14 and 15, the first sum is the in-group information amount (1.8), the second sum is the in-group information amount (0.0) and the first value is "reduction: 1.8−0.0=1.8". In the first case, the third record is the record {IP7, 110} belonging to the first group #1 in FIG. 14. In the first case, different variable values included in another group Ua are the variable values IP7 and 110. The total number of the variable values is 2 ("number of variable values in U: 2"). In the first case, the number of the variable values included in the third record when the variable values are excluded from the first group #1 is 1 indicated by "reduction in #1: 1" as described with reference to FIG. 15. Therefore, in the first case, the second value is 1 (2−1). In the first case, the subtraction value (that is, improvement in evaluation value) obtained by subtracting the second value from the first value is "1.8−α(2−1)=0.8" (α is 1, for example).

In the second case, as in the examples illustrated in FIGS. 14 and 15, the first sum is the in-group information amount (1.8+1.8), the second sum is the in-group information amount (0.3+0.3) and the first value is "reduction: (1.8+1.8)−(0.3+0.3)=3.0". In the second case, the third records are the records {IP7, 110} and {IP6, 110} belonging to the first group #1 in FIG. 14. In the second case, different variable values included in another group Up1 are the variable values IP7, IP6, and 110. The total number of the variable values is 3 ("number of variable values in U: 3").

In the second case, the number of the variable values included in the third records when the variable values are excluded from the first group #1 is 2 indicated by "reduction in #1: 2" as described with reference to FIG. 15. Therefore, in the second case, the second value is 1 (3−2). In the second case, the subtraction value (that is, improvement in evaluation value) obtained by subtracting the second value (1.0) from the first value (3.0) is "3.0−α(3−2)=2.0" (α is 1, for example).

In the first addition processing described above, the rearrangement unit 102b selects m (an integer of 1 or more) records sharing no variable values with each other (S31). Note that m may be described as Nb. Then, the rearrangement unit 102b adds one record to another group in descending order of the logarithm (for example, the in-group information amount) of the reciprocal of the appearance probability (S32). The first addition processing is described in the first case described above.

Next, the rearrangement unit 102b generates a group for rearrangement (for example, the record group U1a in FIG. 15) with the largest improvement in evaluation value, by sequentially adding g (an integer of 1 or more) second records to another group in the second addition processing described above (S34). Upon completion of the addition of the g second records (S35/YES), the rearrangement unit 102b stores the other group in a storage unit (for example, the RAM 12) as a group for arrangement (S36). Then, the rearrangement unit 102b repeatedly performs the first and second addition processing until all the Nb records sharing no variable values with each other to another group (S33 to S36). More specifically, after repeatedly performing the first and second addition processing and adding all the Nb records sharing no variable values with each other to another group, the rearrangement unit 102b selects the group for arrangement stored in the RAM 12 as one or more records (that is, records to be rearranged).

Thereafter, the rearrangement unit 102b rearranges the selected one or more records (that is, records to be rearranged) in a group with the largest reduction in the total sum of the sum of the in-group information amounts and the sum of the inter-group information amounts. Note that the group is any one of the first to third groups #1 to #3.

(Acquisition of Record Group to be Rearranged)

The rearrangement unit 102b moves to S4 since all the records ({IP7, 110} and {IP1, 80}) are acquired from the record group V (S37/YES). The rearrangement unit 102b acquires a record group rg having the largest improvement in evaluation value in the record set Q1 (S4).

In the example illustrated in FIG. 15, the largest improvement in evaluation value is 2.0, and the records belonging to the group Up1 (group U1a) with the largest improvement in evaluation value are the records {IP7, 110} and {IP6, 110}. Meanwhile, in the example illustrated in FIG. 16, the largest improvement in evaluation value is −0.2, and the records belonging to the group Up11 (group U1b) with the largest improvement in evaluation value are the records {IP1, 80} and {IP1, 8080}.

Therefore, the record group rg having the largest improvement in evaluation value in the record set Q1 is the record belonging to the group Up1 (group U1a) with the largest improvement (2.0) in evaluation value in the example illustrated in FIG. 15. Accordingly, the rearrangement unit 102b acquires the record group rg (group U1a) (S4).

(Rearrangement of Record Group)

The rearrangement unit 102b rearranges the record group rg in a group leading to the best evaluation value when the record group rg (group U1a) is rearranged in any one of the first to third groups #1 to #3 (S5). This rearrangement is described with reference to FIGS. 17 to 19.

The rearrangement unit 102b calculates values when the record group rg (group U1a) is rearranged in the first to third groups #1 to #3. These values are in-group information amounts and inter-group information amounts of all records, the sum of the in-group information amounts and the sum of the inter-group information amounts for each group, the total sum of the in-group information amounts and the total sum of the inter-group information amounts, and the evaluation value.

FIG. 17 illustrates a group composition table T21 when the record group rg (group U1a) is rearranged (see the dotted frame) in the first group #1. Note that a case where the record group rg belonging to group X is arranged in the same group X (in other words, not moved) is also described with the term "rearrangement".

The group composition table T21 indicates in-group information amounts and inter-group information amounts of all records, the sum of the in-group information amounts and the sum of the inter-group information amounts for each group, the total sum (27.2) of the in-group information amounts and the total sum (21.1) of the inter-group information amounts, and the evaluation value (48.3).

FIG. 18 illustrates a group composition table T22 when the record group rg (group U1a) is rearranged (see the dotted frame) in the second group #2. The group composition table T22 indicates in-group information amounts and inter-group information amounts of all records, the sum of the in-group information amounts and the sum of the inter-group information amounts for each group, the total sum (24.0) of the in-group information amounts and the total sum (21.1) of the inter-group information amounts, and the evaluation value (45.1).

FIG. 19 illustrates a group composition table T23 when the record group rg (group U1a) is rearranged (see the dotted frame) in the third group #3. The group composition table T23 indicates in-group information amounts and inter-group information amounts of all records, the sum of the in-group information amounts and the sum of the inter-group information amounts for each group, the total sum (25.0) of the in-group information amounts and the total sum (18.9) of the inter-group information amounts, and the evaluation value (43.9).

As illustrated in FIGS. 17 to 19, the rearrangement unit 102b calculates and stores the in-group information amounts and inter-group information amounts of all records, the sum of the in-group information amounts and the sum of the inter-group information amounts for each group, the total sum of the in-group information amounts and the total sum of the inter-group information amounts, and the evaluation value in the RAM 12.

As illustrated in FIG. 19, the evaluation value when the record group rg (group U1a) is rearranged in the third group #3 is the best (in other words, the smallest). The smallest evaluation value is indicated by the balloon "smallest" in FIG. 19. Therefore, the rearrangement unit 102b rearranges the record group rg (group U1a) in the third group #3 (S5). The group composition column in the group composition table T23 illustrated in FIG. 19 corresponds to the group composition column in the group composition table T2 illustrated in FIG. 13.

The rearrangement unit 102b excludes the record group rg (group U1a) from the record set Q1 (S6). Since the record set Q1, from which the record group rg (group U1a) is excluded, includes the group U1b, the record set Q1 is not an empty set (S7/NO). Therefore, the rearrangement unit 102b determines NO in S7 and moves to S4.

The rearrangement unit 102b acquires a record group rg having the largest improvement in evaluation value in the record set Q1 after the exclusion (S4).

In the example illustrated in FIG. 16, the largest improvement in evaluation value is −0.2, and the records belonging to the group Up11 (group U1b) with the largest improvement in evaluation value are the records {IP1, 80} and {IP1, 8080}.

Therefore, the record group rg having the largest improvement in evaluation value in the record set Q1 is the record (group U1b) belonging to the group Up11 (group U1b) with the largest improvement (−0.2) in evaluation value. Accordingly, the rearrangement unit 102b acquires the record group rg (group U1b) (S4).

The rearrangement unit 102b rearranges the record group rg in a group leading to the best evaluation value when the record group rg (group U1b) is rearranged in any one of the first to third groups #1 to #3 (S5). This rearrangement is described with reference to FIGS. 20 to 22. As described above, the rearrangement unit 102b calculates values when the record group rg (group U1b) is rearranged in the first to third groups #1 to #3.

FIG. 20 illustrates a group composition table T31 when the record group rg (group U1b) is rearranged (see the dotted frame) in the first group #1. The group composition table T31 indicates in-group information amounts and inter-group information amounts of all records, the sum of the in-group information amounts and the sum of the inter-group information amounts for each group, the total sum (25.0) of the in-group information amounts and the total sum (18.9) of the inter-group information amounts, and the evaluation value (43.9).

FIG. 21 illustrates a group composition table T32 when the record group rg (group U1b) is rearranged (see the dotted frame) in the second group #2. The group composition table T32 indicates in-group information amounts and inter-group information amounts of all records, the sum of the in-group information amounts and the sum of the inter-group information amounts for each group, the total sum (23.7) of the in-group information amounts and the total sum (21.1) of the inter-group information amounts, and the evaluation value (44.8).

FIG. 22 illustrates a group composition table T33 when the record group rg (group U1b) is rearranged (see the dotted frame) in the third group #3. The group composition table T33 indicates in-group information amounts and inter-group information amounts of all records, the sum of the in-group information amounts and the sum of the inter-group information amounts for each group, the total sum (27.1) of the in-group information amounts and the total sum (21.1) of the inter-group information amounts, and the evaluation value (48.1).

As illustrated in FIGS. 20 to 22, the rearrangement unit 102b calculates and stores the in-group information amounts and inter-group information amounts of all records, the sum of the in-group information amounts and the sum of the inter-group information amounts for each group, the total sum of the in-group information amounts and the total sum of the inter-group information amounts, and the evaluation value in the RAM 12.

As illustrated in FIG. 20, the evaluation value when the record group rg (group U1b) is rearranged in the first group #1 is the best (in other words, the smallest). The smallest evaluation value is indicated by the balloon "smallest" in FIG. 20. Therefore, the rearrangement unit 102b rearranges the record group rg (group U1b) in the first group #1 (S5). The group composition column in the group composition table T31 illustrated in FIG. 20 corresponds to the group composition column in the group composition table T3 illustrated in FIG. 13.

The rearrangement unit 102b excludes the record group rg (group U1b) from the record set Q1 (S6). The record set Q1, from which the record group rg (group U1b) is excluded, is an empty set (S7/YES). Therefore, the rearrangement unit 102b determines YES in S7 and moves to S8. The rearrangement unit 102b calculates the evaluation value e (43.9) after the rearrangement (S8).

Since the evaluation value e (43.9) after the rearrangement is less than the original evaluation value e_pre (see the evaluation value 48.3 in FIG. 14) (S9/NO), the rearrangement unit 102b moves to S10.

The rearrangement unit 102b determines whether or not Steps S2 to S3 are repeated R times (for example, twice). In the examples illustrated in FIGS. 14 to 22, since Steps S2 to S3 are executed once, the rearrangement unit 102b determines NO in S10 and moves to S2.

The rearrangement unit 102b stores the group composition table T31 illustrated in FIG. 20 in the RAM 12 as the original group, and stores the evaluation value (43.9) in the group composition table T31 illustrated in FIG. 20 in the RAM 12 as the original evaluation value e_pre (S2).

(Selection of Record Set to be Rearranged)

Figure 23:
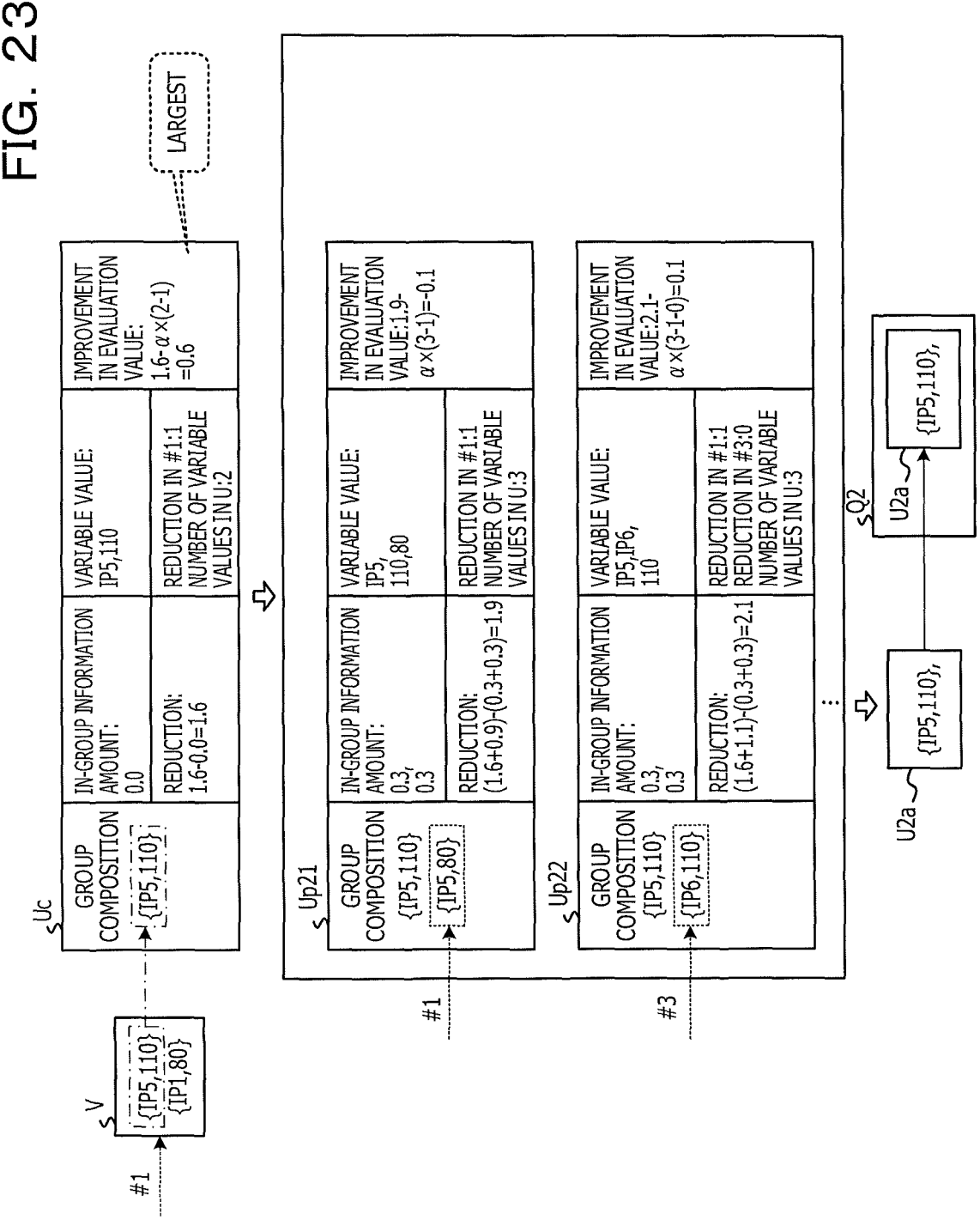
FIG. 23 is an eleventh diagram illustrating a specific example according to the embodiment.
Figure 24:
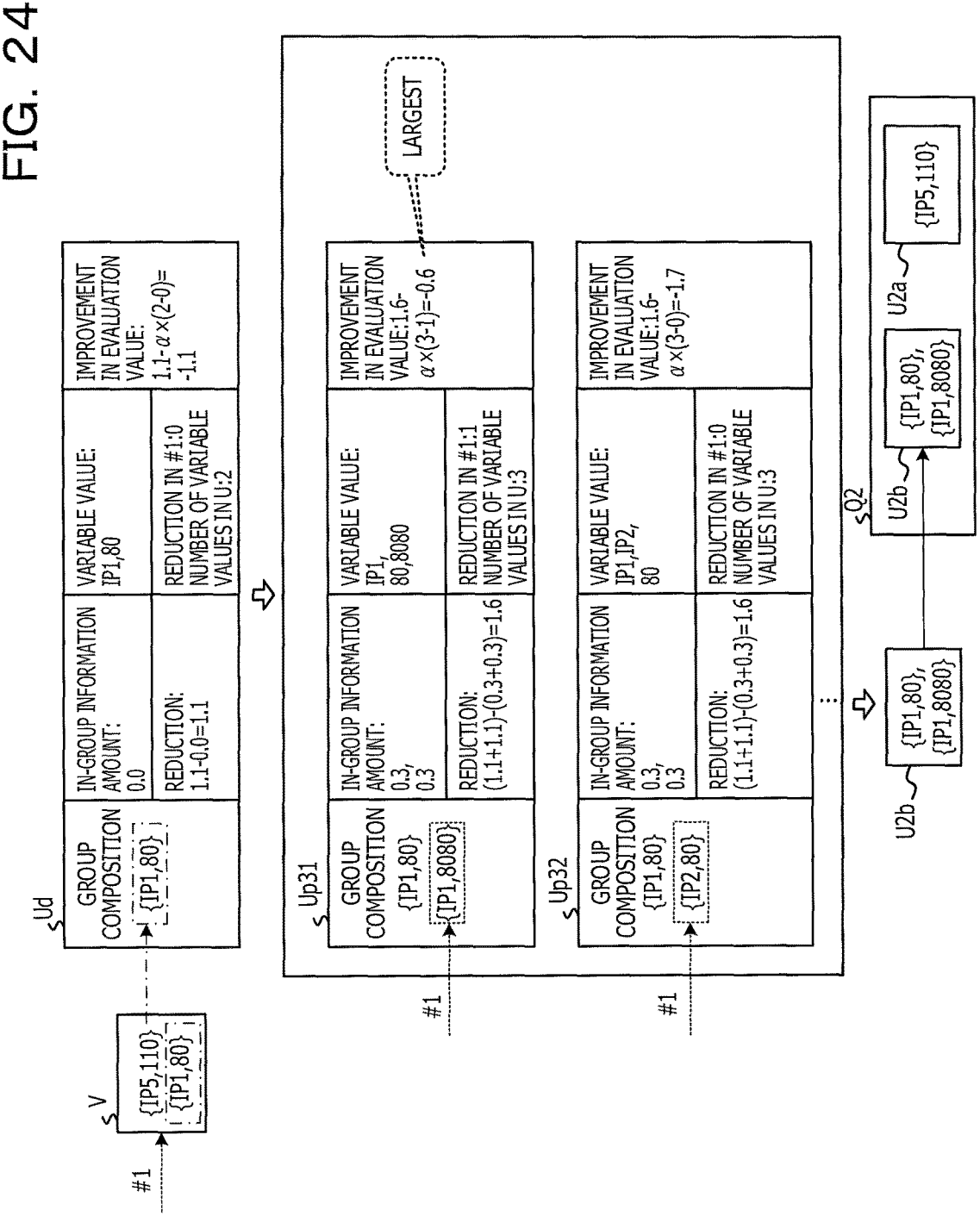
FIG. 24 is a twelfth diagram illustrating a specific example according to the embodiment.

Next, with reference to FIGS. 20 and 23 to 24, selection of a record set Q (S3) is described. The rearrangement unit 102b selects a record group V including m records, which share no variable values with each other, in descending order of in-group information amount from among the records included in the latest group composition table. The latest group composition table is the group composition table T31 illustrated in FIG. 20. The rearrangement unit 102b selects a record group V including m records {IP5, 110} and {IP1, 80}, which share no variable values with each other, for example, in descending order of in-group information amount, from among the records included in the group composition table T31 illustrated in FIG. 20 (S31). In this step, m is 2.

Here, in the group composition table T31 illustrated in FIG. 20, the largest in-group information amount is 1.6 ($-\log\{(3/11)*(1/11)\}$). The record having the largest in-group information amount (1.6) is one record {IP5, 110} belonging the first group #1. Therefore, the rearrangement unit 102b selects the record {IP5, 110}.

A record which does not share the variable value of the selected record {IP5, 110} and has the second largest in-group information amount after the largest in-group information amount (1.6) is the record {IP1, 80}, for example. The second largest in-group information amount after the largest in-group information amount (1.6) is 1.1 ($-\log\{(2/11)*(5/11)\}$). Therefore, the rearrangement unit 102b selects the record {IP1, 80}.

Through the above selection processing, the rearrangement unit 102b selects the two records {IP5, 110} and {IP1, 80} (S31). Then, the rearrangement unit 102b resets the set U to an empty set (S32). Hereinafter, the set U after the reset is described as a set Uc. With reference to FIG. 23, creation of the set Uc is described.

The rearrangement unit 102b acquires one record r1 (for example, {IP5, 110}) sequentially from the record group V including the two records {IP5, 110} and {IP1, 80}, and adds the record r1 to the group Uc (S33). In FIG. 23, the record {IP5, 110} is indicated by the dashed-dotted line frame, while the addition is indicated by the dashed-dotted arrow. Note that the record {IP5, 110} is the record belonging to the first group #1 in the group composition table T31 illustrated in FIG. 20 (see the dotted arrow indicated by "#1" in the record group V in FIG. 23).

The state where the record {IP5, 110} is added to the group Uc is indicated by "group composition: {IP5, 110}" in a cell of the group Uc. The rearrangement unit 102b calculates the in-group information amount 0.0 of the record {IP5, 110} in the group Uc. Note that the in-group information amount of the record {IP5, 110} in the group Uc is 0.0 (−log{(1/1)*(1/1)}).

This calculation is indicated by "in-group information amount: 0.0" in a cell of the group Uc. The variable values of the record {IP5, 110} belonging to the group Uc are IP5 and 110. These variable values are indicated by "variable value: IP5, 110" in a cell of the group Uc.

For example, by rearranging the record {IP5, 110} belonging to the first group #1 in the group Uc, the in-group information amount (1.8) of the record {IP5, 110} in the first group #1 is reduced, and the in-group information amount of the group Uc is increased by 0.0.

Therefore, by rearranging the record {IP5, 110} in the group Uc, the total in-group information amount in the first to third groups #1 to #3 in the group composition table T31 illustrated in FIG. 20 and the group Uc illustrated in FIG. 23 is reduced by 1.6 (1.6−0.0). This reduction is indicated by "reduction: 1.6−0.0=1.6" in a cell of the group Uc.

In FIG. 20, when the record {IP5, 110} belonging to the first group #1 is rearranged in the group Uc, the same variable value as the variable value 110 is excluded from the variable values in the first group #1. However, even after the rearrangement, the variable value IP5 is included in the variable values in the first group #1. Therefore, when the record {IP5, 110} belonging to the first group #1 is rearranged in the group Uc, the number of the variable values is reduced by 1. This reduction is indicated by "reduction in #1: 1" in a cell of the group Uc.

Here, the number of the variable values in the group Uc to which the record {IP5, 110} belongs is 2. This number of the variable values is indicated by "number of variable values in U: 2" in a cell of the group Uc.

The improvement in evaluation value when the record {IP5, 110} belonging to the first group #1 is rearranged in the group Uc is 0.6 (1.6−α×(2−1) where a is 1). "1.6" is a reduction value of the in-group information amount. "2" in "(2−1)" is the number of the variable values in the group Uc to which the record {IP5, 110} belongs. "1" is the reduction in the variable values.

The rearrangement unit 102b executes calculation of the in-group information amount in the group Uc and calculation of the improvement in evaluation value, and stores the calculation results in the RAM 12.

Next, the rearrangement unit 102b adds a record to the group Uc, the record having the largest improvement in evaluation value when the record is added to the group Uc among the records sharing any of the variable values in the group Uc (S34). When the improvement in evaluation value is not increased, the rearrangement unit 102b does not execute this addition of a record. It is assumed, for example, that the record sharing any of the variable values (IP5 or 110) in the group Uc is {IP5, 80}. This record is the record belonging to the first group #1 in the group composition table T31 illustrated in FIG. 20 (see the dotted arrow indicated by "#1" in the group Up21 in FIG. 23).

It is assumed that the record {IP5, 80} belonging to the first group #1 is added to the group Uc. The state where the record {IP5, 80} is added to the group Uc is indicated by "group composition: {IP5, 110}, {IP5, 80}" in a cell of the group Up21. The rearrangement unit 102b calculates the in-group information amount 0.3 in the group Up21 of the records (IP5, 110) and {IP5, 80}. This calculation formula is −log{(2/2)*(1/2)}. Note that the value of −log{(2/2)*(1/2)} is 0.3.

This calculation is indicated by "in-group information amount: 0.3, 0.3" in a cell of the group Up21. The variable values in the records {IP5, 110} and {IP5, 80} belonging to the group Up21 are IP5, 80, and 110. These variable values are indicated by "variable value: IP5, 80, 110" in a cell of the group Up21.

By rearranging the records {IP5, 110} and {IP5, 80} belonging to the first group #1 in the group Up21, the in-group information amount (1.6) of the record {IP5, 110} in the first group #1 and the in-group information amount (0.9) of the record {IP5, 80} in the first group #1 are reduced. This rearrangement increases the in-group information amount of the group Up21 by 0.6 (0.3+0.3).

Therefore, by rearranging the records {IP5, 110} and {IP5, 80} in the group Up21, the total in-group information amount in the first to third groups #1 to #3 in the group composition table T31 illustrated in FIG. 20 and the group Up21 illustrated in FIG. 23 is reduced by 1.9 ((1.6+0.9)−(0.3+0.3)). This reduction is indicated by "reduction: (1.6+0.9)−(0.3+0.3)=1.9" in a cell of the group Up21.

In FIG. 20, when the records {IP5, 110} and {IP5, 80} are rearranged from the first group #1 to the group Up21, the same variable value 110 as the variable value 110 is excluded from the variable values in the first group #1. However, even after the rearrangement, the variables IP5 and 80 are included in the variable values in the first group #1. Therefore, when the records {IP5, 110} and {IP5, 80} belonging to the first group #1 are rearranged in the group Up21, the number of the variable values is reduced by 1. This reduction is indicated by "reduction in #1: 1" in a cell of the group Up21.

Here, the number of the variable values in the group Up21 to which the records {IP5, 110} and {IP5, 80} belong is 3. This number of the variable values is indicated by "number of variable values in U: 3" in a cell of the group Up21.

The improvement in evaluation value when the records {IP5, 110} and {IP5, 80} belonging to the first group #1 are rearranged in the group Up21 is −0.1 (1.9−α×(3−1) where a is 1).

The rearrangement unit 102b executes calculation of the in-group information amount in the group Up21 and calculation of the improvement in evaluation value, and stores the calculation results in the RAM 12.

It is assumed that the record {IP6, 110} belonging to the third group #3 is added to the group Uc (see the dotted arrow indicated by "#3" in the group Up22 in FIG. 23). The state where the record {IP6, 110} is added to the group Uc is indicated by "group composition: {IP5, 110}, {IP6, 110}" in a cell of the group Up22. The rearrangement unit 102b calculates the in-group information amount 0.3 in the group Up22 of the records (IP5, 110) and {IP6, 110}. This calculation formula is −log{(1/2)*(2/2)}. Note that the value of −log{(1/2)*(2/2)} is 0.3.

This calculation is indicated by "in-group information amount: 0.3, 0.3" in a cell of the group Up22. The variable values in the records {IP5, 110} and {IP6, 110} belonging to the group Up22 are IP5, IP6, and 110. These variable values are indicated by "variable value: IP5, IP6, 110" in a cell of the group Up22.

The record {IP5, 110} is rearranged from the first group #1 to the group Up22, and the record {IP6, 110} is rearranged from the third group #3 to the group Up22. This rearrangement reduces the in-group information amount (1.6) of the record {IP5, 110} in the first group #1 and the in-group information amount (1.1) of the record {IP6, 110} in the third group #3, and increases the in-group information amount of the group Up22 by 0.6 (0.3+0.3). Note that the in-group information amount of the record {IP6, 110} in the third group #3 is 1.1 (−log{(3/12)*(4/12)}).

Therefore, by rearranging the records {IP5, 110} and {IP6, 110} in the group Up22, the total in-group information amount in the first to third groups #1 to #3 in the group composition table T31 illustrated in FIG. 20 and the group Up22 illustrated in FIG. 23 is reduced by 2.1 ((1.6+1.1)−(0.3+0.3)). This reduction is indicated by "reduction: (1.6+1.1)−(0.3+0.3)=2.1" in a cell of the group Up22.

When the record {IP5, 110} belonging to the first group #1 is rearranged in the group Up22, the same variable value 110 as the variable value 110 is excluded from the variable values in the first group #1. Therefore, when the record {IP5, 110} belonging to the first group #1 is rearranged in the group Up22, the number of the variable values is reduced by 1. This reduction is indicated by "reduction in #1: 1" in a cell of the group Up22.

When the record {IP6, 110} belonging to the third group #3 is rearranged in the group Up22, the same variable values IP6 and 110 as the variable values IP6 and 110 are not excluded from the variable values in the third group #3. Therefore, even when the record {IP6, 110} belonging to the third group #3 is rearranged in the group Up22, the number of the variable values is not reduced. This no reduction is indicated by "reduction in #3: 0" in a cell of the group Up22.

Here, the number of the variable values in the group Up22 to which the records {IP5, 110} and {IP6, 110} belong is 3. This number of the variable values is indicated by "number of variable values in U: 3" in a cell of the group Up22.

The improvement in evaluation value when the record {IP5, 110} belonging to the first group #1 and the record {IP6, 110} belonging to the third group #3 are rearranged in the group Up22 is 0.1 (2.1−α×(3−1−0) where a is 1).

The rearrangement unit 102b executes calculation of the in-group information amount in the group Up22 and calculation of the improvement in evaluation value, and stores the calculation results in the RAM 12.

As described above, even when the records {IP5, 80} and {IP6, 110} are added to the group Uc, the improvement in evaluation value is not increased to be larger than the improvement (0.6) in evaluation value of the group Uc when the records {IP5, 80} and {IP6, 110} are not added. More specifically, the improvement (0.6) in evaluation value of the group Uc is the largest (see the balloon "largest" in FIG. 23). Thus, the rearrangement unit 102b does not add the records {IP5, 80} and {IP6, 110} to the group Uc.

The rearrangement unit 102b determines whether or not g (g is 1, for example) record is added (S35). Since one record is already added to the group Ua (S35/YES), the rearrangement unit 102b adds the group Uc with the largest improvement in evaluation value to the record set Q2 (S36). Hereinafter, a group of one record included in the group Uc with the largest improvement in evaluation value is indicated by a group U1a.

The rearrangement unit 102b acquires one record r1 ({IP5, 110}) sequentially from the record group V including the two records {IP5, 110} and {IP1, 80}, and thus does not acquire all the records from the record group V (S37/NO). Therefore, the rearrangement unit 102b resets the set U to an empty set (S32). Hereinafter, the set U after the reset is described as a set Ud. With reference to FIG. 24, creation of the set Ud is described.

The rearrangement unit 102b acquires one record r1 (for example, {IP1, 80}) sequentially from the record group V including the two records {IP5, 110} and {IP1, 80}, and adds the record r1 to the group Ud (S33). In FIG. 24, the record {IP1, 80} is indicated by the dashed-dotted line frame, while the addition is indicated by the dashed-dotted arrow. Note that the record {IP1, 80} is the record belonging to the first group #1 in the group composition table T31 illustrated in FIG. 20 (see the dotted arrow indicated by "#1" in the record group V in FIG. 24).

The state where the record {IP1, 80} is added to the group Ud is indicated by "group composition: {IP1, 80}" in a cell of the group Ud. The rearrangement unit 102b calculates the in-group information amount 0.0 of the record {IP1, 80} in the group Ud. This calculation is indicated by "in-group information amount: 0.0" in a cell of the group Ud. The variable values of the record {IP1, 80} belonging to the group Ud are IP1 and 80. These variable values are indicated by "variable value: IP1, 80" in a cell of the group Ud.

For example, by rearranging the record {IP1, 80} belonging to the first group #1 in the group Ud, the in-group information amount (1.1) of the record {IP1, 80} in the first group #1 is reduced, and the in-group information amount of the group Ud is increased by 0.0. Note that the in-group information amount of the record {IP1, 80} in the first group #1 is 1.1 (−log{(2/11)*(5/11)}).

Therefore, by rearranging the record {IP1, 80} in the first group Ud, the total in-group information amount in the first to third groups #1 to #3 in the group composition table T31 illustrated in FIG. 20 and the group Ud illustrated in FIG. 24 is reduced by 1.1 (1.1−0.0). This reduction is indicated by "reduction: 1.1−0.0=1.1" in a cell of the group Ud.

Even when the record {IP1, 80} belonging to the first group #1 is rearranged in the group Ud, the variable values IP1 and 80 are included in the variable values in the first group #1. Therefore, even when the record {IP1, 80} belonging to the first group #1 is rearranged in the group Ud, the number of the variable values is not reduced. This no reduction is indicated by "reduction in #1: 0" in a cell of the group Ud.

Here, the number of the variable values in the group Ud to which the records {IP1, 80} belongs is 2. This number of the variable values is indicated by "number of variable values in U: 2" in a cell of the group Ud.

The improvement in evaluation value when the record {IP1, 80} belonging to the first group #1 is rearranged in the group Ud is −1.1 (1.1−α×(2−0) where a is 1.1). The rearrangement unit 102b may appropriately adjust α. "1.1" is a reduction value of the in-group information amount. "2" in "(2−0)" is the number of the variable values in the group Ud to which the record {IP1, 80} belongs. "0" is the reduction in the variable values.

The rearrangement unit 102b executes calculation of the in-group information amount in the group Ud and calculation of the improvement in evaluation value, and stores the calculation results in the RAM 12.

Next, the rearrangement unit 102b adds a record to the group Ud, the record having the largest improvement in evaluation value when the record is added to the group Ud among the records sharing any of the variable values in the group Ud (S34). It is assumed, for example, that the record sharing any of the variable values (IP1 or 80) in the group Ud is {IP1, 8080}. This record is the record belonging to the first group #1 in the group composition table T31 illustrated in FIG. 20.

It is assumed that the record {IP1, 8080} is added to the group Ud (see the dotted arrow indicated by "#1" in a group Up31 in FIG. 24). The state where the record {IP1, 8080} is added to the group Ud is indicated by "group composition: {IP1, 80}, {IP1, 8080}" in a cell of the group Up31. The rearrangement unit 102b calculates the in-group information amount 0.3 in the group Up31 of the records (IP1, 80) and {IP1, 8080} in the group Up31. This calculation formula is −log{(2/2)*(1/2)}. Note that the value of −log{(2/2)*(1/2)} is 0.3.

This calculation is indicated by "in-group information amount: 0.3, 0.3" in a cell of the group Up31. The variable values in the records {IP1, 80} and {IP1, 8080} belonging to the group Up31 are IP1, 80, and 8080. These variable values are indicated by "variable value: IP1, 80, 8080" in a cell of the group Up31.

By rearranging the records {IP1, 80} and {IP1, 8080} belonging to the first group #1 in the group Up31, the in-group information amount (1.1) of the record {IP1, 80} in the first group #1 and the in-group information amount (1.1) of the record {IP1, 8080} in the first group #1 are reduced. This rearrangement increases the in-group information amount of the group Up31 by 0.6 (0.3+0.3). Therefore, by rearranging the records {IP1, 80} and {IP1, 8080} in the group Up31, the total in-group information amount in the first to third groups #1 to #3 in the group composition table T31 illustrated in FIG. 20 and the group Up31 illustrated in FIG. 24 is reduced by 1.6 ((1.1+1.1)−(0.3+0.3)). This reduction is indicated by "reduction: (1.1+1.1)−(0.3+0.3)=1.6" in a cell of the group Up31.

In FIG. 20, when the records {IP1, 80} and {IP1, 8080} belonging to the first group #1 are rearranged in the group Up31, the same variable value IP1 as the variable value IP1 is excluded from the variable values in the first group #1. However, even after the rearrangement, the variables 80 and 8080 are included in the variable values in the first group #1. Therefore, when the records {IP1, 80} and {IP1, 8080} belonging to the first group #1 are rearranged in the group Up31, the number of the variable values is reduced by 1. This reduction is indicated by "reduction in #1: 1" in a cell of the group Up31.

Here, the number of the variable values in the group Up31 to which the records {IP1, 80} and {IP1, 8080} belong is 3. This number of the variable values is indicated by "number of variable values in U: 3" in a cell of the group Up31.

The improvement in evaluation value when the records {IP1, 80} and {IP1, 8080} belonging to the first group #1 are rearranged in the group Up31 is −0.6 (1.6−α×(3−1) where a is 1.1).

The rearrangement unit 102b executes calculation of the in-group information amount in the group Up31 and calculation of the improvement in evaluation value, and stores the calculation results in the RAM 12.

It is assumed that the record {IP2, 80} belonging to the first group #1 is added to the group Ud (see the dotted arrow indicated by "#1" in a group Up32 in FIG. 24). The state where the record {IP2, 80} is added to the group Ud is indicated by "group composition: {IP1, 80}, {IP2, 80}" in a cell of the group Up32. The rearrangement unit 102b calculates the in-group information amount 0.3 in the group Up32 of the records (IP1, 80) and {IP2, 80} in the group Up32. This calculation formula is −log{(1/2)*(2/2)}. Note that the value of −log{(1/2)*(2/2)} is 0.3. This calculation is indicated by "in-group information amount: 0.3, 0.3" in a cell of the group Up32. The variable values in the records {IP1, 80} and {IP2, 80} belonging to the group Up32 are IP1, IP2, and 80. These variable values are indicated by "variable value: IP1, IP2, 80" in a cell of the group Up32.

The records {IP1, 80} and {IP2, 80} are rearranged from the first group #1 to the group Up32. This rearrangement reduces the in-group information amount (1.1) of the record {IP1, 80} in the first group #1 and the in-group information amount (1.1) of the record {IP2, 80} in the first group #1, and increases the in-group information amount of the group Up32 by 0.6 (0.3+0.3). Note that the in-group information amount of the record {IP2, 80} in the first group #1 is 1.1 (−log{(2/11)*(5/11)}).

Therefore, by rearranging the records {IP1, 80} and {IP2, 80} in the group Up32, the total in-group information amount in the first to third groups #1 to #3 in the group composition table T31 illustrated in FIG. 20 and the group Up32 illustrated in FIG. 24 is reduced by 1.6 ((1.1+1.1)−(0.3+0.3)). This reduction is indicated by "reduction: (1.1+1.1)−(0.3+0.3)=1.6" in a cell of the group Up32.

Even when the records {IP1, 80} and {IP2, 80} belonging to the first group #1 are rearranged in the group Up32, the same variable values IP1, IP2, and 80 are not excluded from the variable values in the first group #1. Therefore, even when the records {IP1, 80} and {IP2, 80} belonging to the first group #1 are rearranged in the group Up32, the number of the variable values is not reduced. This no reduction is indicated by "reduction in #1: 0" in a cell of the group Up32.

Here, the number of the variable values in the group Up32 to which the records {IP1, 80} and {IP2, 80} belong is 3. This number of the variable values is indicated by "number of variable values in U: 3" in a cell of the group Up32.

The improvement in evaluation value when the records {IP1, 80} and {IP2, 80} belonging to the first group #1 are rearranged in the group Up32 is −1.7 (1.6−α×(3−0) where a is 1.1).

The rearrangement unit 102b executes calculation of the in-group information amount in the group Up32 and calculation of the improvement in evaluation value, and stores the calculation results in the RAM 12.

As described above, The improvement in evaluation value when the record {IP1, 8080} is added to the group Ud is −0.6, which is the largest (see the balloon "largest" in FIG. 24). Then, the rearrangement unit 102b adds the record {IP1, 8080} to the group Ud (S34).

The rearrangement unit 102b determines whether or not g (g is 1, for example) record is added (S35). Since one record is already added to the group Ud (S35/YES), the rearrangement unit 102b adds the group Up31 with the largest improvement in evaluation value to the record set Q2 (S36). Hereinafter, a group of two records included in the group Up31 with the largest improvement in evaluation value is indicated by a group U2b.

(Acquisition of Record Group to be Rearranged)

The rearrangement unit 102b moves to S4 since all the records ({IP5, 110} and {IP1, 80}) are acquired from the record group V (S37/YES). The rearrangement unit 102b acquires a record group rg having the largest improvement in evaluation value in the record set Q2 (S4).

In the example illustrated in FIG. 23, the largest improvement in evaluation value is 0.6, and the record belonging to the group Uc (group U2a) with the largest improvement in evaluation value is the record {IP5, 110}. Meanwhile, in the example illustrated in FIG. 24, the largest improvement in evaluation value is −0.6, and the records belonging to the group Up31 (group U2b) with the largest improvement in evaluation value are the records {IP1, 80} and {IP1, 8080}.

Therefore, the record group rg having the largest improvement in evaluation value in the record set Q2 is the group Uc (group U2a) with the largest improvement (0.6) in evaluation value in the example illustrated in FIG. 23. Accordingly, the rearrangement unit 102b acquires the record group rg (group U2a) (S4).

(Rearrangement of Record Group)

The rearrangement unit 102b rearranges the record group rg in a group leading to the best evaluation value when the record group rg (group U2a) is rearranged in any one of the first to third groups #1 to #3 (S5). This rearrangement is described with reference to FIGS. 25 to 27. As described above, the rearrangement unit 102b calculates values when the record group rg (group U2a) is rearranged in the first to third groups #1 to #3.

FIG. 25 illustrates a group composition table T41 when the record group rg (group U2a) is rearranged (see the dotted frame) in the first group #1. The group composition table T41 indicates in-group information amounts and inter-group information amounts of all records, the sum of the in-group information amounts and the sum of the inter-group information amounts for each group, the total sum (25.0) of the in-group information amounts and the total sum (18.9) of the inter-group information amounts, and the evaluation value (43.9).

FIG. 26 illustrates a group composition table T42 when the record group rg (group U2a) is rearranged (see the dotted frame) in the second group #2. The group composition table T42 indicates in-group information amounts and inter-group information amounts of all records, the sum of the in-group information amounts and the sum of the inter-group information amounts for each group, the total sum (23.6) of the in-group information amounts and the total sum (19.1) of the inter-group information amounts, and the evaluation value (42.7).

FIG. 27 illustrates a group composition table T43 when the record group rg (group U2a) is rearranged (see the dotted frame) in the third group #3. The group composition table T43 indicates in-group information amounts and inter-group information amounts of all records, the sum of the in-group information amounts and the sum of the inter-group information amounts for each group, the total sum (24.9) of the in-group information amounts and the total sum (19.1) of the inter-group information amounts, and the evaluation value (44.0).

As illustrated in FIGS. 25 to 27, the rearrangement unit 102b calculates and stores the in-group information amounts and inter-group information amounts of all records, the sum of the in-group information amounts and the sum of the inter-group information amounts for each group, the total sum of the in-group information amounts and the total sum of the inter-group information amounts, and the evaluation value in the RAM 12.

As illustrated in FIG. 26, the evaluation value when the record group rg (group U2a) is rearranged in the second group #2 is the best (in other words, the smallest). The smallest evaluation value is indicated by the balloon "smallest" in FIG. 26. Therefore, the rearrangement unit 102b rearranges the record group rg (group U2a) in the second group #2 (S5). The group composition column in the group composition table T42 illustrated in FIG. 26 corresponds to the group composition column in the group composition table T4 illustrated in FIG. 13.

The rearrangement unit 102b excludes the record group rg (group U2a) from the record set Q2 (S6). The record set Q2, from which the record group rg (group U2a) is excluded, includes the group U2b and thus is not an empty set (S7/NO). Therefore, the rearrangement unit 102b determines NO in S7 and moves to S4.

The rearrangement unit 102b acquires a record group rg having the largest improvement in evaluation value in the record set Q2 after the exclusion (S4).

In the example illustrated in FIG. 24, the largest improvement in evaluation value is −0.6, and the records belonging to the group Up31 (group U2b) with the largest improvement in evaluation value are the records {IP1, 80} and {IP1, 8080}.

Therefore, the record group rg having the largest improvement in evaluation value in the record set Q2 is the record belonging to the group Up31 (group U2b) with the largest improvement (−0.6) in evaluation value. Accordingly, the rearrangement unit 102b acquires the record group rg (group U2b) (S4). As described above, the rearrangement unit 102b calculates values when the record group rg (group U2b) is rearranged in the first to third groups #1 to #3.

The rearrangement unit 102b rearranges the record group rg in a group leading to the best evaluation value when the record group rg (group U2b) is rearranged in any one of the first to third groups #1 to #3 (S5). This rearrangement is described with reference to FIGS. 28 to 30. The rearrangement unit 102b calculates values when the record group rg (group U2b) is rearranged in the first to third groups #1 to #3.

FIG. 28 illustrates a group composition table T51 when the record group rg (group U2b) is rearranged (see the dotted frame) in the first group #1. The group composition table T51 indicates in-group information amounts and inter-group information amounts of all records, the sum of the in-group information amounts and the sum of the inter-group information amounts for each group, the total sum (23.6) of the in-group information amounts and the total sum (19.1) of the inter-group information amounts, and the evaluation value (42.7).

FIG. 29 illustrates a group composition table T52 when the record group rg (group U2b) is rearranged (see the dotted frame) in the second group #2. The group composition table T52 indicates in-group information amounts and inter-group information amounts of all records, the sum of the in-group information amounts and the sum of the inter-group information amounts for each group, the total sum (23.8) of the in-group information amounts and the total sum (19.9) of the inter-group information amounts, and the evaluation value (43.7).

FIG. 30 illustrates a group composition table T53 when the record group rg (group U2b) is rearranged (see the dotted frame) in the third group #3. The group composition table T53 indicates in-group information amounts and inter-group information amounts of all records, the sum of the in-group information amounts and the sum of the inter-group information amounts for each group, the total sum (26.4) of the in-group information amounts and the total sum (21.3) of the inter-group information amounts, and the evaluation value (47.7).

As illustrated in FIGS. 28 to 30, the rearrangement unit 102b calculates and stores the in-group information amounts and inter-group information amounts of all records, the sum of the in-group information amounts and the sum of the inter-group information amounts for each group, the total sum of the in-group information amounts and the total sum of the inter-group information amounts, and the evaluation value in the RAM 12.

As illustrated in FIG. 28, the evaluation value when the record group rg (group U2b) is rearranged in the first group #1 is the best (in other words, the smallest). The smallest evaluation value is indicated by the balloon "smallest" in FIG. 20. Therefore, the rearrangement unit 102b rearranges the record group rg (group U2b) in the first group #1 (S5). The group composition column in the group composition table T51 illustrated in FIG. 28 corresponds to the group composition column in the group composition table T5 illustrated in FIG. 13.

The rearrangement unit 102b excludes the record group rg (group U2b) from the record set Q2 (S6). The record set Q2, from which the record group rg (group U2b) is excluded, is an empty set (S7/YES). Therefore, the rearrangement unit 102*b* determines YES in S7 and moves to S8. The rearrangement unit 102*b* calculates the evaluation value e (42.7) after the rearrangement (S8).

Since the evaluation value e (42.7) after the rearrangement is less than the original evaluation value e_pre (see the evaluation value 43.9 in FIG. 20) (S9/NO), the rearrangement unit 102*b* moves to S10.

The rearrangement unit 102*b* determines whether or not Steps S2 to S3 are repeated R times (for example, twice). In the examples illustrated in FIGS. 14 to 22, since Steps S2 to S3 are executed twice, the rearrangement unit 102*b* determines YES in S10 and terminates the processing.

The rearrangement unit 102*b* inputs the group composition table T51 illustrated in FIG. 28 illustrating the groups after the rearrangement to the output unit 103. The output unit 103 outputs a group identifier stored in the group column in the group composition table T51 illustrated in FIG. 28 and records belonging to a group identified by the group identifier to the terminal device TA. In other words, the rearrangement unit 102*b* outputs the group identifier stored in the group column and the classified records stored in the group composition column in the group composition table T51 illustrated in FIG. 28 to the terminal device TA.

As described above, the data classification apparatus according to this embodiment executes the discrete data classification processing taking into consideration not only the in-group information amount but also the inter-group information amount. As a result, the discrete data may be classified into optimum groups that may easily achieve the analyst's purpose.

Also, the data classification apparatus according to this embodiment selects one or more records that may be estimated to maximize a reduction in evaluation value, and sets the selected one or more records as records for rearrangement (see S36 in FIG. 12 and FIGS. 15, 16, 23, and 24).

Meanwhile, there is also conceivable a method of randomly creating a record group to be rearranged and rearranging the created record group in a group (for example, the first to third groups #1 to #3) in such a manner as to minimize the evaluation value. However, execution of such a method on a number of records results in an enormous amount of calculation, which is not realistic. However, the data classification apparatus according to this embodiment selects one or more records that may be estimated to maximize a reduction in evaluation value, and then rearranges the selected one or more records in a group in such a manner as to minimize the evaluation value. Therefore, an increase in the amount of calculation may be suppressed, and a processing load may be reduced.

Moreover, the data classification apparatus according to this embodiment may select more than one record for rearrangement. Thus, classification may be performed in such a manner as to minimize the number (commonality number) of the same variable values belonging to different groups.

For example, when a record group including more than one record is combined into a certain group, discrete data classification using the method described with reference to FIGS. 2 to 7 may not suppress an increase in the number of the same variable values belonging to different groups. As a result, it becomes difficult for the record group belonging to a certain group to be arranged in another group. However, since more than one record for rearrangement may be selected, the increase in the number of the same variable values may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A classification method executed by a computer for classifying a plurality of records into a plurality of groups, the classification method comprising:
   acquiring the plurality of records, each record of the plurality of records including a variable value;
   tentatively classifying the plurality of records into the plurality of groups;
   calculating each appearance probability of the respective variable value in each of the tentatively classified groups;
   calculating, for each same variable value, a commonality value indicating a degree of commonality of the same variable value among the plurality of groups based on a number of groups in which the same variable value is included among the tentatively classified groups;
   classifying, based on the appearance probability and the commonality value, the plurality of records into the plurality of groups in such a manner as to increase the appearance probability and reduce the commonality value; and
   outputting a result of the classifying.

2. The classification method according to claim 1, wherein
   the commonality value is calculated based on a total number of different variable values belonging to each of the tentatively classified groups, and
   the classifying includes calculating a sum of reciprocals of the appearance probability and classifying the plurality of records into the plurality of groups in such a manner as to reduce a total sum of the sum of the reciprocals and a sum of the commonality values of the respective variable values.

3. The classification method according to claim 2, wherein the classifying includes calculating a first sum of logarithms of the reciprocals of the appearance probability, calculating a second sum of logarithms of the commonality values of the variable values, and classifying the plurality of records into the plurality of groups in such a manner as to reduce a total sum of the first sum and the second sum.

4. The classification method according to claim 3, wherein
   the tentatively classifying includes generating Na groups by randomly selecting Na records from among the plurality of records in such a manner as to reduce variable values to be shared, and
   the Na is an integer of 2 or more.

5. The classification method according to claim 4, further comprising:
   generating a group in which the plurality of records, except for the Na records, are arranged in the Na groups in such a manner as to increase the appearance probability of the record, which belongs to the group, appearing in the group;

selecting, from among the records belonging to the Na groups, at least one first record that maximizes a reduction in the total sum of the first sum and the second sum, when the records are arranged in different groups; and arranging the at least one first record, from a first group to which the at least one first record belongs, to a second group in which the at least one first record maximizes the reduction in the total sum of the first sum and the second sum.

6. The classification method according to claim 5, wherein the selecting includes selecting diverse records, which share no variable values with each other, as the at least one first record, in descending order of the logarithm of the reciprocal of the appearance probability.

7. The classification method according to claim 6, wherein each of the plurality of records includes a plurality of variable values.

8. The classification method according to claim 7, further comprising:

executing first addition processing to add a selected first record to another group other than the Na groups;

selecting a second record including any one of the plurality of variable values included in the selected first record, from among the records included in the data; and executing second addition processing to add the second record to the other group.

9. The classification method according to claim 8, wherein the selecting of the at least one first record includes estimating the reduction every time a record is added to the other group and selecting the other group when a largest subtraction value is estimated, as the at least one first record.

10. A classification device for classifying a plurality of records into a plurality of groups, the classification device comprising:

a memory; and a processor coupled to the memory and configured to:

acquire the plurality of records, each record of the plurality of records including a variable value, tentatively classify the plurality of records into the plurality of groups, calculate each appearance probability of the respective variable value in each of the tentatively classified groups;

calculate, for each same variable value, a commonality value indicating a degree of commonality of the variable value among the plurality of groups based on a number of groups in which the same variable value is included among the tentatively classified groups, classify, based on the appearance probability and the commonality value, the plurality of records into the plurality of groups in such a manner as to increase the appearance probability and reduce the commonality value, and output a result of a classification.

11. The classification device according to claim 10, wherein the commonality value is calculated based on a total number of different variable values belonging to each of the tentatively classified groups, and the processor is configured to calculate a sum of reciprocals of the appearance probability and classifying the plurality of records into the plurality of groups in such a manner as to reduce a total sum of the sum of the reciprocals and a sum of the commonality values of the respective variable values.

12. The classification device according to claim 11, wherein the processor is configured to:

calculate a first sum of logarithms of the reciprocals of the appearance probability, calculate a second sum of logarithms of the commonality values of the variable values, and classify the plurality of records into the plurality of groups in such a manner as to reduce a total sum of the first sum and the second sum.

13. The classification device according to claim 12, wherein the tentatively classifying includes generating Na groups by randomly selecting Na records from among the plurality of records in such a manner as to reduce variable values to be shared, and the Na is an integer of 2 or more.

14. The classification device according to claim 13, wherein the processor is configured to:

generate a group in which the plurality of records, except for the Na records, are arranged in the Na groups in such a manner as to increase the appearance probability of the record, which belongs to the group, appearing in the group, select, from among the records belonging to the Na groups, at least one first record that maximizes a reduction in the total sum of the first sum and the second sum, when the records are arranged in different groups, and arrange the at least one first record, from a first group to which the at least one first record belongs, to a second group in which the at least one first record maximizes the reduction in the total sum of the first sum and the second sum.

15. The classification device according to claim 14, wherein the processor is configured to select diverse records, which share no variable values with each other, as the at least one first record, in descending order of the logarithm of the reciprocal of the appearance probability.

16. The classification device according to claim 15, wherein each of the plurality of records includes a plurality of variable values.

17. The classification device according to claim 16, wherein the processor is configured to:

execute first addition processing to add a selected first record to another group other than the Na group, select a second record including any one of the plurality of variable values included in the selected first record, from among the records included in the data, and execute second addition processing to add the second record to the other group.

18. A non-transitory storage medium storing a classification program for classifying a plurality of records into a plurality of groups, which causes a computer to execute a procedure, the procedure comprising:

acquiring the plurality of records, the plurality of records including a variable value;

tentatively classifying the plurality of records into the plurality of groups;

calculating each appearance probability of the respective variable value in each of the tentatively classified groups;

calculating, for each same variable value, a commonality value indicating a degree of commonality of the variable value among the plurality of groups based on a number of groups in which the same variable value is included among the tentatively classified groups;

classifying, based on the appearance probability and the commonality value, the plurality of records into the plurality of groups in such a manner as to increase the appearance probability and reduce the commonality value;

outputting a result of the classifying.

* * * * *